US012452186B2

(12) United States Patent
McDonnell et al.

(10) Patent No.: US 12,452,186 B2
(45) Date of Patent: Oct. 21, 2025

(54) METHOD AND APPARATUS TO ASSIGN AND CHECK ANTI-REPLAY SEQUENCE NUMBERS USING LOAD BALANCING

(71) Applicant: Intel Corporation, Santa Clara, CA (US)

(72) Inventors: Niall McDonnell, Limerick (IE); Pravin Pathak, Bridgewater, NJ (US); Rahul Shah, Chandler, AZ (US); Declan Doherty, Clondalkin (IE)

(73) Assignee: Intel Corporation, Santa Clara, CA (US)

( * ) Notice: Subject to any disclaimer, the term of this patent is extended or adjusted under 35 U.S.C. 154(b) by 797 days.

(21) Appl. No.: 17/553,543

(22) Filed: Dec. 16, 2021

(65) Prior Publication Data

US 2023/0198912 A1 Jun. 22, 2023

(51) Int. Cl.

| | |
|---|---|
| ***H04L 47/70*** | (2022.01) |
| ***H04L 9/40*** | (2022.01) |
| ***H04L 47/2441*** | (2022.01) |
| ***H04L 47/27*** | (2022.01) |
| ***H04L 47/34*** | (2022.01) |

(52) U.S. Cl.

CPC .......... *H04L 47/34* (2013.01); *H04L 47/2441* (2013.01); *H04L 47/27* (2013.01); *H04L 63/18* (2013.01)

(58) Field of Classification Search

None

See application file for complete search history.

(56) References Cited

U.S. PATENT DOCUMENTS

2004/0205332 A1 10/2004 Bouchard et al.
2014/0269690 A1 * 9/2014 Tu .......................... H04L 47/10 370/389

OTHER PUBLICATIONS

European Search Report and Search Opinion, EP App. No. 22202698.1, May 11, 2023, 10 pages.

* cited by examiner

*Primary Examiner* — Willie J Daniel, Jr.

(74) *Attorney, Agent, or Firm* — NICHOLSON DE VOS WEBSTER & ELLIOTT LLP

(57) ABSTRACT

Methods and apparatus to assign and check anti-replay sequence numbers. In one embodiment, a method includes assigning, by circuitry, sequence numbers to packets of traffic flows, wherein a first sequence number is assigned to a first packet based on a determination that the first packet is within a first traffic flow mapped to a first secure channel, and wherein the first sequence number is within a set of sequence numbers allocated to the first secure channel and maintained by the circuitry. The method continues with allocating the packets of traffic flows to be processed among a plurality of processor cores and processing the packets of traffic flows by the plurality of processor cores.

20 Claims, 12 Drawing Sheets

```
If ARW_CHECK                                # If a check is requested

    If SN > CWL + MAX_AHEAD                 # Discard packet as it is too far ahead

        Mark the QE for discard             # With full 64b SN, this may never occur
        NEXT                                # May not do "MAX_AHEAD" check

    If SN < CWL                             # Also discard if too far behind
        Mark the QE for discard
        NEXT

802 bit_pos = SN % W                        # Bit position in bit mask

    If SN < CWL + W                         # Falls within the window

804     If BM[bit_pos]                      # Replay detected
            Mark for discard
        Else                                # Packet is good
            BM[bit_pos] = 1                 # RMW required
        NEXT
```

Fig. 8

METHOD AND APPARATUS TO ASSIGN AND CHECK ANTI-REPLAY SEQUENCE NUMBERS USING LOAD BALANCING

TECHNICAL FIELD

Embodiments of the invention relate to the field of computing system; and more specifically, the embodiments are related to an apparatus and method to assign and check anti-replay sequence numbers using load balancing.

BACKGROUND ART

A Run-To-Completion (RTC) model in a packet processing application assigns one or more network queues to a core of a multicore processor and lets the processing run till the end. The incoming flows get statically distributed through a hash to the cores. While this works well for normal sized flows, it cannot handle high throughput flows. This is especially true when a single high bandwidth flow exceeds the processing capacity of a core. The model cannot scale throughput by just adding more cores. Switching to a pipeline model is required to handle high bandwidth flows. To achieve this, processing is broken down into multiple stages. Yet the stages contend for the packet cache lines and the inter stage communication becomes critical. The need for synchronization among the stages limits the use of software solution to address this problem.

A load balancing system may be used to address the critical need of the multi-stage pipeline. The load balancing system may load balance the incoming flows without any locks and optionally recover the original order. For example, traffic flows in an Internet Protocol Security (IPSec) protocol may be processed in the load balancing system, which improves the scalability of processing traffic flows, and such scalability may be linear. While the pipeline provides the flexibility of running various stages independently, it is prone to a performance limitation of the slowest stage, which tends to be the one that needs atomic processing of a traffic flow. Processing IPSec packets includes a sequence number (SN) generation and anti-replay (AR) check scheme, a common part of security protocols, that prevents a third party from replaying captured packets into the traffic flow. In IPSec, a unique sequence number is generated for each outgoing packet of a given IPSec tunnel during the outbound processing stage, and during the inbound processing stage the sequence number is validated using a window of acceptable numbers. Duplicate or out-of-the-window packets are dropped at the inbound processing stage. This window is constantly moved with successful decryption of accepted packets.

The load balancing system may isolate the sequence number generation stage and run it atomically so that each packet for a given security association (SA) gets a unique sequence number. The atomicity requirement of sequence number generation stage per SA thus introduces a limitation in the outbound direction. In the inbound direction, the load balancing system may also isolate the sequence number check stage and window update stage since these processes need to be done in an atomic manner per SA. This poses a requirement of two different atomic stages in the inbound direction and that greatly limits the performance and scalability of processing IPSec traffic flows. Additionally, each stage of the pipeline adds some overhead, the atomic stages thus dilute the overall value of the load balancing system in both outbound and inbound directions.

BRIEF DESCRIPTION OF THE DRAWINGS

The invention may best be understood by referring to the following description and accompanying drawings that are used to show embodiments of the invention. In the drawings:

FIG. 8 illustrates pseudo code for anti-replay check operation per some embodiments.

DETAILED DESCRIPTION

Figure 1:
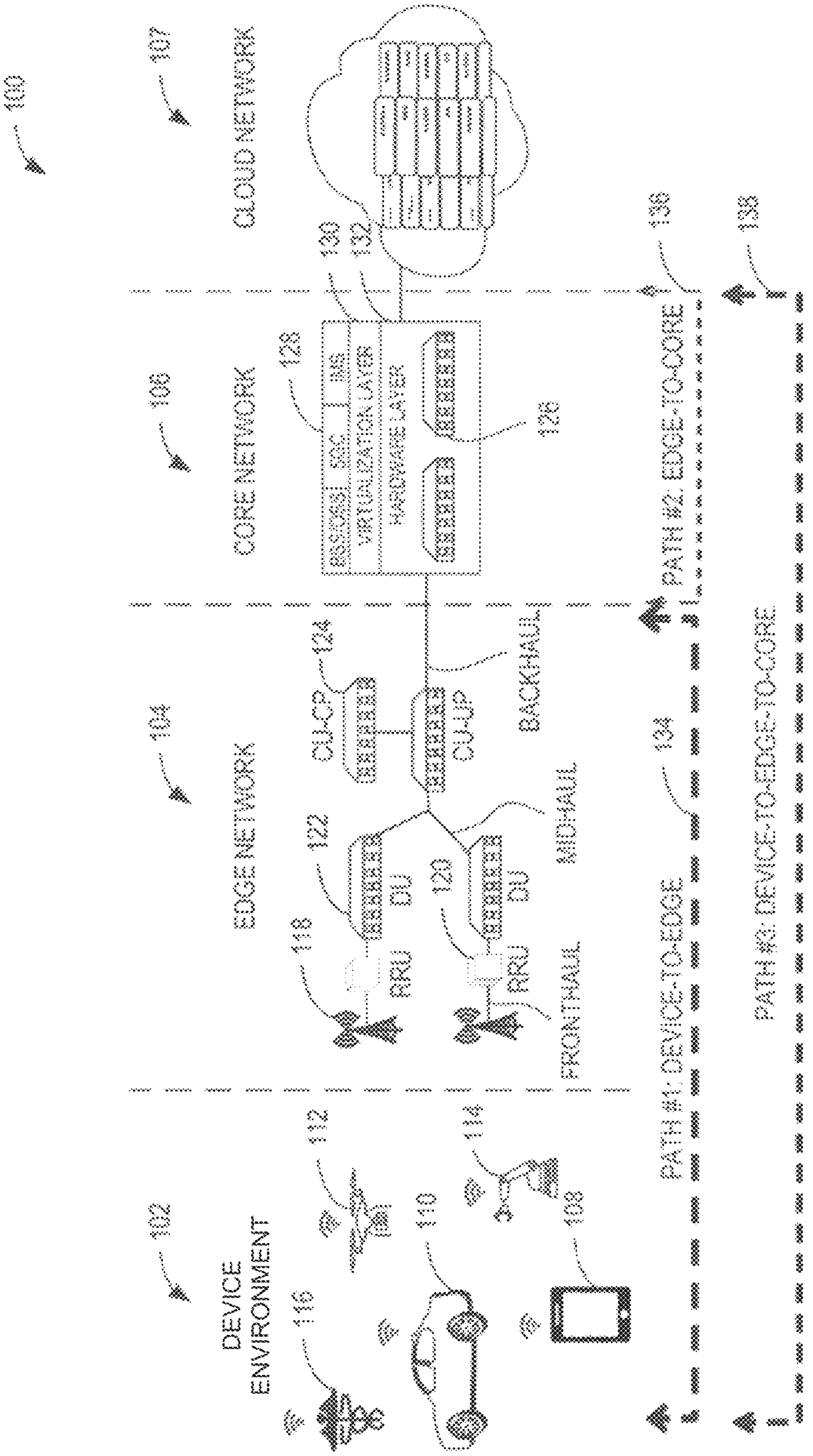
FIG. 1 is an illustration of an example multi-core computing environment 100.

In the following description, numerous specific details are set forth. However, it is understood that embodiments of the invention may be practiced without these specific details. In other instances, well-known circuits, structures, and techniques have not been shown in detail in order not to obscure the understanding of this description.

Bracketed text and blocks with dashed borders (such as large dashes, small dashes, dot-dash, and dots) may be used to illustrate optional operations that add additional features to the embodiments of the invention. Such notation, however, should not be taken to mean that these are the only options or optional operations, and/or that blocks with solid borders are not optional in some embodiments of the invention.

References in the specification to “one embodiment,” “an embodiment,” “an example embodiment,” etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following description and claims may use the terms "coupled" and "connected," along with their derivatives. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein, refers to any positive whole number of items including one item.

Multi-Core Computing Environment and Load Balancing

Multi-core computing systems are implemented in a variety of applications and environments. Load-balancing techniques have been used in the multi-core computing systems and provided much needed efficiency improvement. The implementation of load-balancing can be illustrated using the Multi-access edge computing (MEC) as an example. Note that while the MEC is illustrated as a non-limiting example, the principles of load-balancing as discussed herein can be and are implemented in other computing environments.

The MEC is a network architecture concept that enables cloud computing capabilities and an infrastructure technology service environment at the edge of a network, such as a cellular network. Using MEC, data center cloud services and applications can be processed closer to an end user or computing device to improve network operation.

While MEC is an important part of the evolution of edge computing, cloud and communication service providers are addressing the need to transform networks of the cloud and communication service providers in preparation for fifth generation cellular network technology (i.e., 5G). To meet the demands of next generation networks supporting 5G, cloud service providers can replace fixed function proprietary hardware with more agile and flexible approaches that rely on the ability to maximize the usage of multi-core edge and data center servers. Next generation server edge and data center networking can include an ability to virtualize and deploy networking functions throughout a data center and up to and including the edge. High packet throughput amplifies the need for better end-to-end latency, Quality of Service (QoS), and traffic management. Such needs in turn drive requirements for efficient data movement and data sharing between various stages of a data plane pipeline across a network. Note that while 5G is used as an example of new cellular network technology, embodiments of the invention may be implemented in other new or existing cellular network technologies (e.g., 4G/LTE and 6G).

Queue management as disclosed herein can provide efficiencies in the network by reducing a time that a CPU core spends marshalling pointers to data structures, data packets (also referred to as packets and the two terms are used interchangeably unless noted otherwise), etc., between cores of the CPU. For example, hardware queue management as disclosed herein can improve system performance (e.g., network system performance, 5G system performance, etc.) related to handling network data across CPU cores by foregoing overhead of passing data structures and pointers from one CPU core to another.

Queue management as disclosed herein can be implemented with hardware queue management that effectuates queue management in hardware. In some disclosed examples, hardware queue management can be implemented by an example hardware queue manager (HQM) or an HQM implemented as a Dynamic Load Balancer (DLB). For example, the HQM, when implemented as a DLB, can implement, effectuate, and/or otherwise execute dynamic load balancing functions, computing, or processing tasks, etc. As used herein, the terms "hardware queue manager," "hardware queueing manager," and "HQM" are equivalent and used interchangeably. As used herein, the terms "dynamic load balancer" and "DLB" are equivalent and used interchangeably and refer to a load balancer (LB) implemented via an HQM. While "DLB" is used as an example of circuitry/circuit to perform load balancing operations in a computing system, other circuitry/circuits may bear another name while implementing the load balancing operations in some embodiments disclosed herein.

In some disclosed examples, the HQM can enable pipelined packet processing and support hundreds of millions of queue management and load balancing operations per second for run-to-completion (RTC) and pipelined network processing approaches. Hardware queue management as disclosed herein can replace software queues (e.g., queues associated with software queue management), especially software queues associated with multiple producer CPU cores and/or multiple consumer CPU cores. As used herein, the terms "producer core" and "producer CPU core" are used interchangeably and refer to a core that creates and/or otherwise generates an element (e.g., a queue element) to enqueue to the HQM. As used herein, the terms "consumer core" and "consumer CPU core" are used interchangeably and refer to a core that acts on the result of a dequeue from the HQM.

Applications that use the example HQM as disclosed herein can benefit from an enhanced overall system performance via efficient workload distribution compared to software queue management, where one of the most typical usages of software queuing is load balancing. Typical queueing schemes can use CPU cores to distribute work, which burdens the CPU cores with queuing and reordering tasks, as opposed to using the CPU cores for high-value add worker core processing with hardware-based queue management built-in load balancing functionality, as disclosed herein. The example HQM as disclosed herein can remove direct core-to-core interactions and effectuate the load balancing in hardware.

Dimensioning refers to the process of allocating, distributing, and/or otherwise scheduling computing applications across an entire slice of a computing network or system architecture. In some instances, dimensioning can be implemented in the computing network by deploying a producer-consumer model. A producer (e.g., a data producer) can refer to an agent (e.g., a hardware agent, a software agent, etc.) that places a type of message onto a queue (e.g., a buffer, a computing queue, a computing task queue, etc.). A consumer (e.g., a data consumer) can refer to the same agent or a different agent that can remove the message from the queue for processing. In some instances, the message can refer to machine-readable data representative of one or more pointers (e.g., one or more identifiers) that correspond to data in memory (e.g., non-volatile memory, volatile memory, etc.) or other indications of a computing task to be executed. Problems can arise when the producer attempts to add messages to a full queue or a consumer attempts to remove messages from an empty queue.

Prior techniques for deploying the producer-consumer model in MEC-based applications and data centers can include software that manages queues including data to be executed by one or more cores (also referred to as computing cores, hardware cores, processing cores, processor cores, CPU cores, etc.) of a processor or other type of processor circuitry. Such prior techniques can allocate (e.g., statically allocate) the data to a core to be executed at random or without regard for an instant utilization of the core. For example, prior techniques can allocate incoming data to be processed to a core that is experiencing a heavy computing workload thereby generating a bottleneck in processing the incoming data due to an unavailability of processing ability or bandwidth by the core. In such examples, the incoming data can correspond to an elephant or fat traffic flow. In some such examples, a core can be assigned to a network interface controller (NIC) to receive data packets of the elephant flow from the NIC. The NIC can spray packets randomly via receive side scaling (RSS) thereby reducing bandwidth associated with the core and/or, more generally, a processor that includes the core. As used herein, an elephant flow or fat flow is a single session, relatively long running network connection that consumes a large or disproportionate amount of bandwidth of a core and/or, more generally, a processor that includes the core. The elephant or fat flow can be extremely large (in total bytes) or high in traffic volume and extremely long in time or duration. In some embodiments, a traffic flow (also referred to as data flow or flow, and these terms are used interchangeably unless noted otherwise) is defined as a set of packets whose headers match a given pattern of bits. A flow may be identified by a set of attributes embedded to one or more packets of the flow. An exemplary set of attributes includes a 5-tuple (source and destination IP addresses, a protocol type, source and destination TCP/UDP ports.

Accordingly, such prior techniques do not take into account resource availability, cost structures, etc., of computing resources in the computing architecture (e.g., the multi-core computing architecture) and, thus, can be impacted by lock latency, memory latency, cache behaviors, polling multiple queues, etc., which can increase the time necessary to process incoming data. Lock latency can occur in response to a spinlock or a spinlock condition. A spinlock refers to a lock that a thread (e.g., a computing thread, a core thread, a hardware thread, etc.) attempts to acquire but waits in a loop (i.e., spins) while repeatedly checking to see if the lock is available. As the thread remains active but is not performing a useful task, the use of such a lock is akin to busy waiting. Once acquired, spinlocks will usually be held until they are explicitly released, although in some implementations they may be automatically released if the thread being waited on (e.g., the thread which holds the lock) blocks, or enters a sleep mode.

Spinlocks become wasteful if held for longer durations, as they may prevent other threads from running and require rescheduling. The longer a thread holds a lock, the greater the risk that the thread will be interrupted by the operating system (OS) scheduler while holding the lock. If this happens, other threads will be left in a holding pattern (i.e., spinning) (e.g., repeatedly trying to acquire the lock), while the thread holding the lock is not making progress towards releasing it. The result is an indefinite postponement until the thread holding the lock can finish and release it. This is especially true on a single-processor system, where each waiting thread of the same priority is likely to waste its quantum (e.g., allocating time where a thread can run) spinning until the thread that holds the lock is finally finished.

Examples disclosed herein include the HQM to improve load balancing and workload distribution in computer network architectures, such as multi-core computer network architectures. Examples disclosed herein reduce and/or otherwise eliminate spinlock penalties. In some disclosed examples, the HQM enables pipelined processing of data (e.g., data packets in a cellular or other wireless network) between multiple producers (e.g., producer cores) and multiple consumers (e.g., consumer cores). A producer core can offload scheduling of computing tasks to the example HQM to allocate a workload by the producer core to an available consumer core of a plurality of consumer cores. By offloading the scheduling to the example HQM, the producer core can become available to execute high value-added core processing tasks. Advantageously, the example HQM can remove direct core-to-core interactions and execute scheduling and corresponding load balancing tasks in hardware.

In some disclosed examples, the HQM implements a load balancer (e.g., a DLB) to improve load balancing and workload distribution in computer network architectures. In such disclosed examples, the DLB can scale (e.g., dynamically scale) up a quantity of consumer cores used to facilitate a distribution, transmission, and/or processing of an elephant flow to optimize and/or otherwise improve a throughput, a line rate, a bandwidth, etc., associated with the elephant flow. For example, the DLB can distribute the elephant flow based on a scheduling type (e.g., atomic scheduling, ordered scheduling, etc.) to one or more consumer cores, receive the processed elephant flow from the one or more consumer cores, and re-order and/or aggregate the processed elephant flow in preparation for distribution and/or transmission to different hardware, a different logic entity, etc.

Note that the "atomic" scheduling is also referred to as atomic distribution, and it ensures that packets from a given flow can only be outstanding on a single core at a given time. It dynamically allocates (also referred to as pinning) flows to cores, migrating flows between cores to load balance when required. This preserves the flow order and allows the processing software to operate in a lock-free manner "Ordered" scheduling is also referred to as ordered distribution, which provides a means of restoring the original flow order while the packets may be processed concurrently in multiple cores. Synchronization mechanisms may still be required in the software. This type of processing is useful if the bandwidth of individual flows approaches or exceeds the capability of individual cores.

FIG. 1 is an illustration of an example multi-core computing environment 100. The multi-core computing environment 100 includes an example device environment 102, an example edge network 104, an example core network 106, and an example cloud network 107. For example, the device environment 102 can be a 5G device environment that facilitates the execution of computing tasks using a wireless network, such as a wireless network based on 5G (e.g., a 5G cellular network).

The device environment 102 includes example devices (e.g., computing devices or electronic devices) 108, 110, 112, 114, 116. The devices 108, 110, 112, 114, 116 include a first example device 108, a second example device 110, a third example device 112, a fourth example device 114, and a fifth example device 116. The first device 108 is a 4G or 5G Internet-enabled smartphone (e.g., a 4G, 5G, or future generation IP-enabled smartphone). Alternatively, the first device 108 may be a tablet computer, an Internet-enabled laptop, etc. The second device 110 is a vehicle (e.g., a combustion engine vehicle, an electric vehicle, a hybrid-electric vehicle, etc.). For example, the second device 110 can be an electronic control unit or other hardware included the vehicle, which, in some examples, can be a self-driving, autonomous, or computer-assisted driving vehicle.

The third device 112 is an aerial vehicle. For example, the third device 112 can be a processor or other type of hardware included in an unmanned aerial vehicle (UAV) (e.g., an autonomous UAV, a human or user-controlled UAV, etc.), such as a drone. The fourth device 114 is a robot. For example, the fourth device 114 can be a collaborative robot or other type of machinery used in assembly, lifting, manufacturing, etc., types of tasks.

The fifth device 116 is a healthcare associated device. For example, the fifth device 116 can be a computer server that stores and/or processes health care records. In other examples, the fifth device 116 can be a medical device, such as an infusion pump, magnetic resonance imaging (MRI) machine, a surgical robot, a vital sign monitoring device, etc. In some examples, one or more of the devices 108, 110, 112, 114, 116 may be a different type of computing device, such as a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device. In some examples, there may be fewer or more devices than depicted in FIG. 1.

The devices 108, 110, 112, 114, 116 and/or, more generally, the device environment 102, are in communication with the edge network 104 via first example networks 118. The first networks 118 are cellular networks (e.g., 5G cellular networks). For example, the first networks 118 can be implemented by and/or otherwise facilitated by antennas, radio towers, etc., and/or a combination thereof. Additionally or alternatively, one or more of the first networks 118 may be an Ethernet connection, a digital subscriber line (DSL) connection, a telephone line connection, a coaxial cable system, a satellite system, a line-of-site wireless system, a cellular telephone system, etc., and/or a combination thereof. The devices in device environment 102 may establish secure communication channels (also referred to as tunnels) through the edge network 104 to communicate with each other or other devices (e.g., the ones in the edge network 104, core network 106, and/or cloud network 107), and the secure communication channels may be implemented through protocols such as Internet Protocol Security (IPSec) protocol, Transport Layer Security (TLS), encrypted virtual private networks (EVPNs) (e.g., WireGuard), or any other secure communication protocols. Also note that a cellular network is used to describe the multi-core computing environment 100, embodiments of the invention may be implemented in security communication within other wireless networks (e.g., WiFi, WiMax), wireline networks (e.g., generic Ethernet networks), or hybrid of wireline and wireless networks.

In the illustrated example of FIG. 1, the edge network 104 includes the first networks 118, example remote radio units (RRUs) 120, example distributed units (DUs) 122, and example centralized units (CUs) 124. In this example, the DUs 122 and/or the CUs 124 are multi-core computing systems. For example, one or more of the DUs 122 and the CUs 124 can include a plurality of processors that each include a plurality of cores (e.g., processor cores). In such examples, the DUs 122 and/or the CUs 124 are edge servers (e.g., 5G edge servers), such as multi-core edge servers, that can effectuate the distribution of traffic flows (e.g., a flow of one or more packets) through the edge network 104 to a different destination (e.g., the device environment 102, the core network 106, etc.). In some examples, fewer or more of the first networks 118, the RRUs 120, the DUs 122, and/or the CUs 124 may be used than depicted in FIG. 1.

In this example, the RRUs 120 are radio transceivers (e.g., remote radio transceivers, also referred to as remote radio heads (RRHs)) in a radio base station. For example, the RRUs 120 are hardware that can include radio frequency (RF) circuitry, analog-to-digital/digital-to-analog converters, and/or up/down power converters that connects to a network of an operator (e.g., a cellular operator or provider). In such examples, the RRUs 120 can convert a digital signal to RF, amplify the RF signal to a desired power level, and radiate the amplified RF signal in air via an antenna. In some examples, the RRUs 120 can receive a desired band of signal from the air via the antenna and amplify the received signal. The RRUs 120 are termed as remote because the RRUs 120 are typically installed on a mast-top, or tower-top location that is physically distant from base station hardware, which is often mounted in an indoor rack-mounted location or installation.

In the illustrated example of FIG. 1, the RRUs 120 are coupled and/or otherwise in communication with a respective one of the DUs 122. In this example, the DUs 122 include hardware that implement real time Layer 1 (L1) scheduling functions (e.g., physical layer control) and/or Layer 2 (L2) scheduling functions (e.g., radio link control (RLC), medium access control (MAC), etc.). In this example, the CU 124 includes hardware that implements Layer 3 scheduling functions, such as packet data convergence control (PDCP) and/or radio resource control (RRC) functions. In this example, a first one of the CUs 124 is a centralized unit control plane (CU-CP) and a second one of the CUs 124 is a centralized unit user plane (CU-UP).

In this example, at least one of one or more of the DUs 122 and/or one or more of the CUs 124 implement a virtualized radio access network (vRAN). For example, one or more of the DUs 122 and/or one or more of the CUs 124 can execute, run, and/or otherwise implement virtualized baseband functions on vendor-agnostic hardware (e.g., commodity server hardware) based on the principles of Network Functions Virtualization (NFV). NFV is a network architecture concept that uses the technologies of infrastructure technology (IT) virtualization to virtualize entire classes of network node functions into building blocks that may be connected, or chained together, to create communication services.

In the illustrated example of FIG. 1, first connection(s) between the first networks 118 and the RRUs 120 implement(s) the fronthaul of the edge network 104. Second connection(s) between the DUs 122 and the CUs 124 implement(s) the midhaul of the edge network 104. Third connection(s) between the CUs 124 and the core network 106 implement(s) the backhaul of the edge network 104.

In the illustrated example of FIG. 1, the core network 106 includes example core devices 126. In this example, the core devices 126 are multi-core computing systems. For example, one or more of the core devices 126 can include a plurality of processors that each include a plurality of cores (e.g., processor cores). For example, one or more of the core devices 126 can be servers (e.g., physical servers, virtual servers, etc., and/or a combination thereof). In such examples, one or more of the core devices 126 can be implemented with the same hardware as the DUs 122, the CUs 124, etc. In some examples, one or more of the core devices 126 may be any other type of computing device.

The core network 106 is implemented by different logical layers including an example application layer 128, an example virtualization layer 130, and an example hardware layer 132. In some examples, the core devices 126 are core servers. In some examples, the application layer 128 or portion(s) thereof, the virtualization layer 130 or portion(s) thereof, or the hardware layer 132 or portion(s) thereof implement a core server. For example, a core server can be implemented by the application layer 128, the virtualization layer 130, and/or the hardware layer 132 associated with a first one of the core devices 126, a second one of the cores devices 126, etc., and/or a combination thereof. In this example, the application layer 128 can implement business support systems (BSS), operations support systems (OSS), 5G core (5GC) systems, Internet Protocol multimedia core network subsystems (IMS), etc., in connection with operation of a telecommunications network, such as the multi-core computing environment 100 of FIG. 1. In this example, the virtualization layer 130 can be representative of virtualizations of the physical hardware resources of the core devices 126, such as virtualizations of processing resources (e.g., CPUs, graphics processing units (GPUs), etc.), memory resources (e.g., non-volatile memory, volatile memory, etc.), storage resources (e.g., hard-disk drives, solid-state disk drives, etc.), network resources (e.g., NICs, gateways, routers, etc.), etc. In this example, the virtualization layer 130 can control and/or otherwise manage the virtualizations of the physical hardware resources with a hypervisor that can run one or more virtual machines (VMs) built and/or otherwise composed of the virtualizations of the physical hardware resources.

The core network 106 is in communication with the cloud network 107. In this example, the cloud network 107 can be a private or public cloud services provider. For example, the cloud network 107 can be implemented using virtual and/or physical hardware, software, and/or firmware resources to execute computing tasks.

In the illustrated example of FIG. 1, multiple example communication paths 134, 136, 138 are depicted including a first example communication path 134, a second example communication path 136, and a third example communication path 138. In this example, the first communication path 134 is a device-to-edge communication path that corresponds to communication between one(s) of the devices 108, 110, 112, 114, 116 of the device environment 102 and one(s) of the first networks 118, RRUs 120, DUs 122, and/or CUs 124 of the edge network 104. The second communication path 136 is an edge-to-core communication path that corresponds to communication between one(s) of the first networks 118, RRUs 120, DUs 122, and/or CUs 124 of the edge network 104 and one(s) of the core devices 126 of the core network 106. The third communication path 138 is a device-to-edge-to-core communication path that corresponds to communication between one(s) of the devices 108, 110, 112, 114, 116 and one(s) of the core devices 126 via one(s) of the first networks 118, RRUs 120, DUs 122, and/or CUs 124 of the edge network 104. Each of the communication paths may be used to implement secure communication channels (e.g., an IPSec tunnel) between devices in the multi-core computing environment 100. Note that the terms of IPSec tunnel and IPSec channel are used interchangeably herein.

In some examples, bandwidth associated with the edge network 104 can be diminished, reduced, etc., in response to inefficient distribution of workloads (e.g., computing workloads) to a core of a processor (e.g., a core of a processor included in the DUs 122, the CUs 124, etc., and/or a combination thereof). For example, each of the DUs 122, the CUs 124, etc., can include at least one processor that includes a plurality of cores (e.g., computing cores, processing cores, etc.). In some such examples, a NIC of the edge network 104 that is in communication with the processor can distribute an elephant flow to a single core of the processor. In some such examples, the single core may require additional time to process the elephant flow. Advantageously, examples described herein improve such distribution of workloads in the edge network 104 and/or, more generally the multi-core computing environment 100 of FIG. 1, by dynamically scaling a quantity of cores assigned to an execution of an elephant flow.

Figure 2:
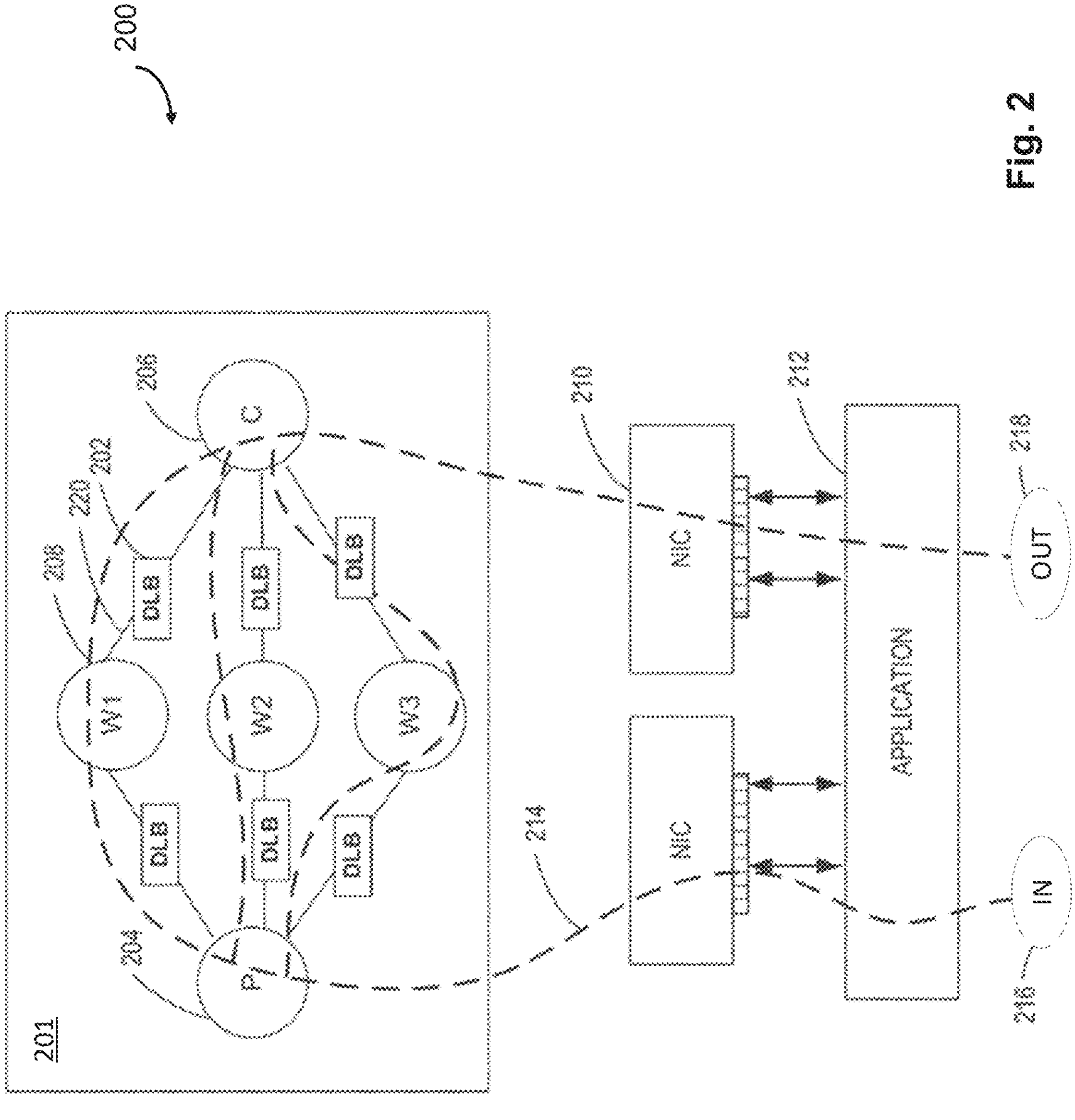
FIG. 2 is an illustration of an example implementation of an example multi-core computing system 200 including an example processor 201 including example dynamic load balancers (DLBs) 202.

FIG. 2 is an illustration of an example implementation of an example multi-core computing system 200 including an example processor 201 including example dynamic load balancers (DLBs) 202. For example, the multi-core computing system 200 can implement one of the devices 108 to 116, the DUs 122, the CUs 124, the core devices 126, etc., of FIG. 1. The multi-core computing system 200 includes an example producer core 204, an example consumer core 206, example worker cores 208, example NICs 210, and an example application (e.g., a firmware and/or software application) 212.

In example operation, the application 212 facilitates an example traffic flow 214 to flow from an example input 216 to an example output 218. In this example, the traffic flow 214 is an elephant flow, a fat flow, etc. The application 212 directs the traffic flow 214 from the input 216 to the producer core 204 via a first one of the NICs 210. Advantageously, the multi-core computing system 200 can process different sizes of data packets associated with the traffic flow 214 of this example or a different traffic flow.

In example operation, one or more of the DLBs 202 can enqueue data (e.g., add and/or otherwise place an element, such as a queue element (QE), onto a queue) from the producer core 204 and dequeue (e.g., remove an element, such as a queue element, from a queue) the enqueued data to one(s) of the worker cores 208, such as a first worker core (W1), a second worker core (W2), and/or a third worker core (W3) of the worker cores 208. For example, the DLBs 202 can enqueue data from the producer core 204 and dequeue data to one(s) of the worker cores 208 via first example connections 220 represented by solid lines. In this example, the enqueued data and/or the dequeued data include data pointers (e.g., identifiers, data identifiers, etc.), data references to data (e.g., IPSec packet(s)) stored in memory, etc. In response to obtaining the dequeued data, the one(s) of the worker cores 208 retrieve data packet(s) (or other data) of the traffic flow 214 that are referenced and/or otherwise correspond to the dequeued data from memory of the multi-core computing system 200. In response to obtaining the data packet(s), the one(s) of the worker cores 208 execute a computing task, a computing operation, etc., associated with the data packet(s). For example, the worker cores 208 can execute and/or otherwise perform tasks such as deep packet inspection tasks, firewall tasks, Internet Protocol Security (IPsec) tasks to process packets (e.g., encrypting or decrypting a packet), etc.

In example operation, in response to executing the computing tasks, the one(s) of the worker cores 208 can enqueue the data pointers corresponding to the processed data packet(s) to one(s) of the DLBs 202, which, in turn, dequeue the data pointers to the consumer core 206. In response to dequeuing the data pointers from the one(s) of the DLBs 202, the consumer core 206 retrieves the corresponding processed data packet(s). In response to retrieving the processed data packet(s), the consumer core 206 can transmit the processed data packet(s) to the output 218 via a second one of the NICs 210 and/or the application 212. Although two instances of the NICs 210 are depicted in FIG. 2, alternatively the two instances may be combined into a single instance and/or a different number of the NICs 210 may be used. Note that in some embodiments, the one or more DLBs 202 may be a single DLB that operates at the different stages with a subset or all of workers 208.

Figure 3:
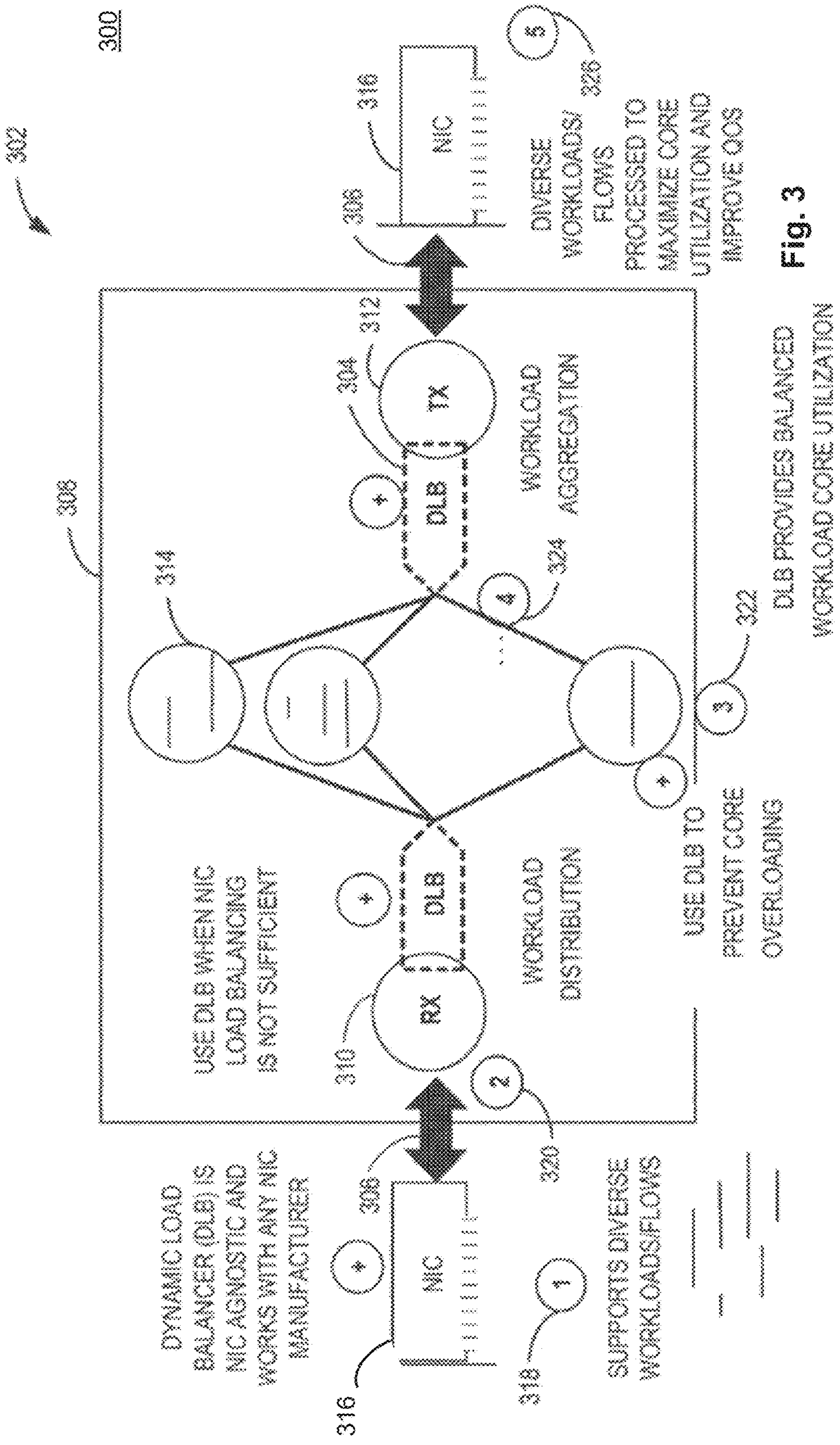
FIG. 3 is an illustration of an example workflow 300 executed by an example multi-core computing system 302 including an example DLB 304 to process an example traffic flow 306.

FIG. 3 is an illustration of an example workflow 300 executed by an example multi-core computing system 302 including an example DLB 304 to process an example traffic flow 306. For example, the multi-core computing system 302 can implement one of the devices 108 to 116, the DUs 122, the CUs 124, the core devices 126, etc., of FIG. 1. The multi-core computing system 302 includes an example processor 308, which includes an example producer core 310, an example consumer core 312, and example worker cores 314, and example NICs 316. In some examples, the producer core 310 can correspond to the producer core 204 of FIG. 2. In some examples, the consumer core 312 can correspond to the consumer core 206 of FIG. 2. In some examples, one or more of the worker cores 314 can correspond to one(s) of the worker cores 208 of FIG. 2.

In the illustrated example of FIG. 3, the producer core 310 is a receiver (RX) core and the consumer core 312 is a transmitter (TX) core. In this example, although depicted separately, the producer core 310 and the consumer core 312 are the same core, but represent different functions (e.g., a receive data function or task, a transmit data function or task, etc.) executed by that same core. Alternatively, the producer core 310 and the consumer core 312 may be different cores.

In the illustrated example of FIG. 3, although two instances of the NIC 316 are depicted, the two instances of the NIC 316 correspond to the same NIC 316 in this example. For example, the NIC 316 can transmit data to the producer core 310 and the same NIC 316 can obtain data from the consumer core 312. Alternatively, the two instances of the NIC 316 may be separate NICs. In some examples, one or more of the NICs 316 correspond to a NIC associated with the edge network 104 and/or the core network 106 of FIG. 1. In some examples, one or more of the NICs 316 correspond to at least one of the NICs 210 of FIG. 2.

In the illustrated example of FIG. 3, although two instances of the DLB 304 are depicted, the two instances of the DLB 304 correspond to the same DLB 304 in this example. For example, the DLB 304 can be included in the same processor 308 as the producer core 310 and the consumer core 312. In such examples, the DLB 304 can enqueue data from the producer core 310 and the same DLB 304 can dequeue data to one(s) of the worker cores 314. In some examples, more than one of the DLB 304 can be used. For example, a first instance of the DLB 304 can enqueue data from the producer core 310 for a first traffic flow and a second instance of the DLB 304 can enqueue data from the producer core 310 for a second traffic flow.

In the workflow 300, during a first example operation 318, the NIC 316 obtains the traffic flow 306 (e.g., an elephant flow) from a device (e.g., one(s) of the devices 108, 110, 112, 114, 116 of FIG. 1). During a second example operation 320, the producer core 310 obtains a data packet of the traffic flow 306 and a pointer that corresponds to the data packet from the NIC 316. During the second operation 320, the DLB 304 associated with the producer core 310 enqueues the pointer. During the second operation 320, a first one of the worker cores 314 dequeues the pointer from the DLB 304 (e.g., from a queue included in the DLB 304). During a third example operation 322, the first one of the worker cores 314 retrieves the data packet identified by the pointer and executes an operation (e.g., a computing operation) of interest on the data packet.

During a fourth example operation 324 of the first workflow 300, the DLB 304 enqueues the pointer from the first one of the worker cores 314 in response to the first one of the worker cores 314 completing the operation on the data packet. During the fourth operation 324, responsive to the enqueuing, the DLB 304 re-orders and/or aggregates the pointer with other pointers corresponding to previously processed data packets. During the fourth operation 324, the DLB 304 dequeues the pointer to the consumer core 312. During a fifth example operation 326, the consumer core 312 retrieves the processed data packet corresponding to the pointer and transmits the processed data packet to the NIC 316, which, in turn, transmits the processed data packet to different hardware, firmware, and/or software.

Advantageously, the DLB 304 is NIC agnostic and can work and/or otherwise is compatible with a NIC from any NIC manufacturer in some embodiments. Advantageously, the processor 308 can offload scheduling tasks from the producer core 310 to the DLB 304 when the load balancing effectuated by the NIC 316 is not sufficient. Advantageously, the processor 308 can use the DLB 304 to prevent core overloading, such as one or more of the worker cores 314 being utilized closer to an upper utilization limit while other one(s) of the worker cores 314 are idle and/or otherwise in a sleep or low-powered state. Advantageously, the DLB 304 provides balanced workload core utilization by dequeuing pointers to available one(s) of the worker cores 314 to process data packets of the traffic flow 306. Advantageously, the DLB 304 and/or, more generally, the processor 308 can support diverse workloads, traffic flows, etc., such as short duration and small sized traffic flows, elephant flows, etc. Advantageously, the DLB 304 and/or, more generally, the processor 308 can process the diverse workloads, traffic flows, etc., to increase and/or otherwise maximize core utilization and improve Quality-of-Service (QoS) of the traffic flow 306.

Using Load Balancing to Generate and Check Anti-Replay Sequence Numbers

Dynamic Load Balancer (DLB) is used as an example of dedicated hardware circuitry (e.g., a hardware queue manager (HQM)) to distribute traffic flows to be processed among cores in a multi-core computing system to improve processing efficiency. Such load balancing system eliminates spinlock penalties, yet the multi-stage pipeline to process traffic flows may suffer performance penalty when atomic processing of the traffic flows is needed.

For example, a multi-core computing system may implement a sequence number (SN) generation and an anti-replay (AR) check scheme to process traffic flows in security protocols (such as IPSec protocol). The DLB isolates the sequence number generation stage and runs it atomically so that each packet for a given security association (SA) gets a unique sequence number. Note a security association (SA) is the establishment of shared security attributes between two network entities to support secure communication of a traffic flow. An SA maps to a secure communication channel and may be identified by an SA ID. The secure communication channel identified by the SA ID can be an IPSec tunnel, a TLS session, an EVPN session, or a secure channel implemented in another secure communication protocol.

An SA may include attributes such as cryptographic algorithm and mode, traffic encryption key, and parameters for the network data to be passed over the connection. The framework for establishing security associations is provided by the Internet Security Association and Key Management Protocol (ISAKMP). Protocols such as Internet Key Exchange (IKE) and Kerberized Internet Negotiation of Keys (KINK) provide authenticated keying material. The sequence number (SN) generation and anti-replay (AR) check scheme are implemented in the outbound and inbound load balancing operations, and the two parts are explained in further details below.

Outbound Load Balancing Operations

Figure 4:
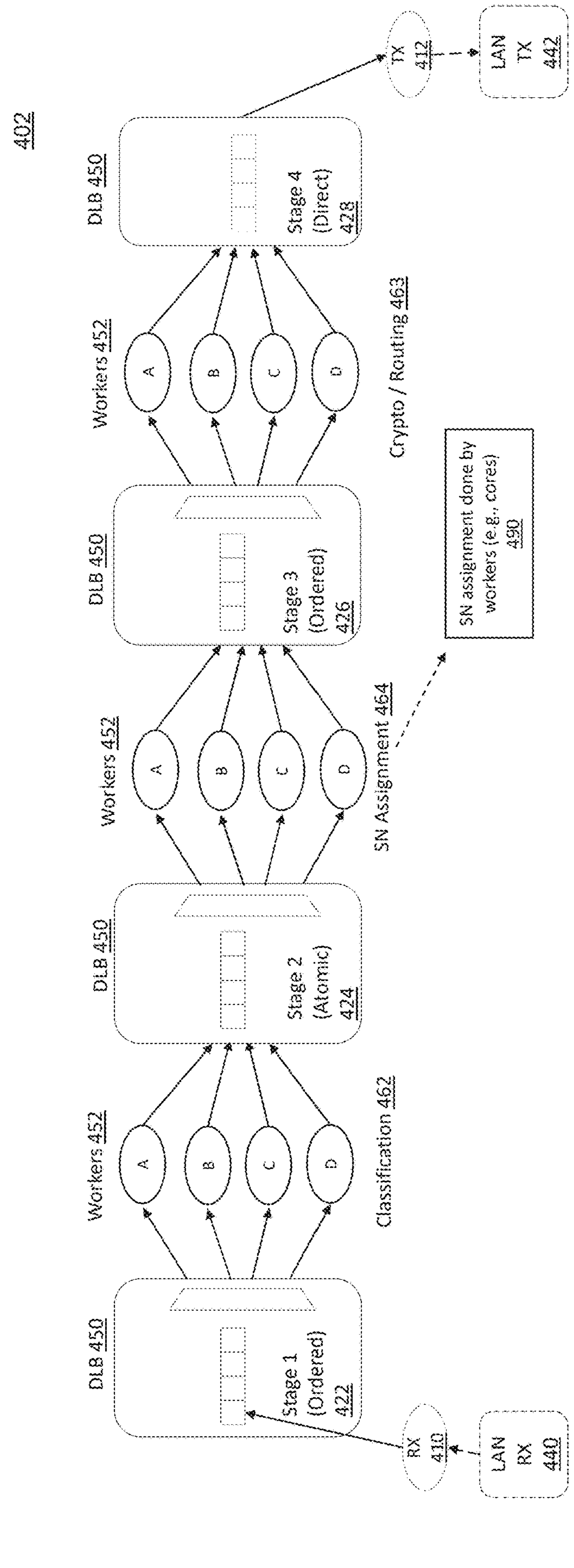
FIG. 4 illustrates outbound load balancing operations using an atomic stage in a multi-core computing system.

FIG. 4 illustrates outbound load balancing operations using an atomic stage in a multi-core computing system. The multi-core computing system 402 includes a receiver (RX) core 410 and a transmitter (TX) core 412 (e.g., cores same or similar to the RX core 310 and TX core 312, respectively), through which the multi-core computing system 402 receives and transmits packets of traffic flows respectively. The traffic flows are forwarded from one or more local area network (LAN) receiving ports 440 to the RX core 410 and transmitted to one or more LAN transmitting ports 442 from the TX core 412 in some embodiments. Packets of the traffic flows are forwarded in secure communication channels such as IPSec tunnels in the multi-core computing system 402. While IPSec tunnels are used as the example of the secure communication channels, other secure communication channels TLS sessions and EVPN sessions may be implemented in some embodiments of the invention.

In some embodiments, workers 452 include cores A to D (workers includes more or less cores in other embodiments), and they can be one or more of the worker cores 208 or 314, and DLB 450 can be one or more of DLBs 202 or 304. The workers 452 and DLB 450 at the different stages of the multi-stage packet processing pipeline can be the same or different cores and DLBs. At stage one 422, packets from traffic flows are received and distributed in an ordered scheduling at DLB 450, which load balances the packets. The distribution of packets includes allocating queue elements (QEs) (e.g., points to packets) to the processing queues of individual cores of workers 452. The enqueued data are processed by workers 452, which classifies the packets of flows. The classification 462 determines whether the packets require IPSec processing and if so, identifies the correct SAs corresponding to the IPSec tunnels mapped to the traffic flows to which the respective packets belong. The classification may be based on metadata mapped to the packets. For example, an anti-replay flag in the metadata may be set for a packet required IPSec processing.

Classification 462 at workers 452 in stage one 422 is done in parallel using ordered load balancing queues to recover receive order at next stage enqueue. Workers 452 performs security policy (SP) lookup and SA association lookup and an appropriate SA ID (e.g., one mapped to the corresponding IPSec tunnel) is assigned to packets of each flow depending on the classification outcome. The packets are then enqueued for the next stage.

As packets from any given SA can be in processing concurrently on multiple cores (workers 452), if sequence number generation is attempted at this point, costly atomic semantics would be required. To avoid this, stage two 424 is added as an atomic stage for sequence number assignment (per SA upon sequence number generation). The atomic stage means DLB 450 guarantees that no packets from the same SA (atomic flow) will be processed concurrently on separate cores. With the added stage, the atomic semantics are not required at workers 452, and sequence number assignment at reference 464 is simple running counter. However, each DLB stage comes with some overhead, which is estimated in the range of 50-100 processing cycles. In stage two 424, DLB 452 funnels all processing for a given SA to a single core (using the atomic scheduling), which does the sequence number assignment 464 for the given SA.

Once the sequence number assignment 464 is done at stage two 424, the packets may be ciphered/routed out of order at stage three 426, where ciphering and routing are performed at reference 466 with no atomic guarantees and DLB 450 may load balance the packets in a given flow to be processed by multiple workers of workers 452. The ciphering and routing of packets of the traffic flows include one or more of the operations including IPSec encapsulations, cryptography preparation, cryptographic processing (encryption), IPSec post-crypto process, cache (Level 2/3) processing in some embodiments.

At stage four 428, the original packet order is restored by DLB 450, and the packets are forwarded to the TX core 412 using direct scheduling, where DLB 450 recovers packets in flows are forwarded in the original packet order as at the RX core 410 prior to the multi-stage pipeline. In direct scheduling, the packets of different flows are processed in a single queue (also referred to as a single link) as in the original packet order as they were prior to entering the multi-stage pipeline.

Note that the atomic scheduling at stage two for sequence number assignment creates overhead, and since packets for a given SA is aggregated to a single core for this stage, the pipeline limits the performance to constraints of a single core resource (e.g., computation/storage). An alternative approach for the sequence number assignment is that the cores process packets using atomic increments to shared sequence numbers (cores sharing sequence numbers per SA) to collaboratively maintain the sequence numbers. Yet the atomics are expensive, depending on the degree of contention, which can be high.

To remove the atomic operations at stage two above, a DLB may atomically generate and assign sequence numbers in outbound direction before load balancing and ciphering/routing the packets. The DLB is already used to spread the processing of high bandwidth tunnels across multiple cores, it makes sense to offload some of the processing from cores to the DLB. The DLB can maintain a monotonically increasing counter (to generate and allocate sequence numbers) per SA. The cores can provide the SA ID while sending the queue element (QE) (e.g., a packet pointer) into the DLB and the DLB will initialize a sequence number (e.g., starting from 0 or another integer) for the input SA ID. The QE includes metadata mapped to the packet in a flow and the metadata includes a setting (e.g., a flag) indicating that sequence number assignment is needed for the packet. When the QE is load balanced to a worker, the correct sequence number will be provided to that worker for insertion into the packet. If QE represents a batch of packets, hardware can also have the ability to allocate a contiguous range of sequence numbers covering all packets in the batch. An enqueued QE will carry requirement on how many sequence numbers are needed to be allocated for the QE.

Figure 5:
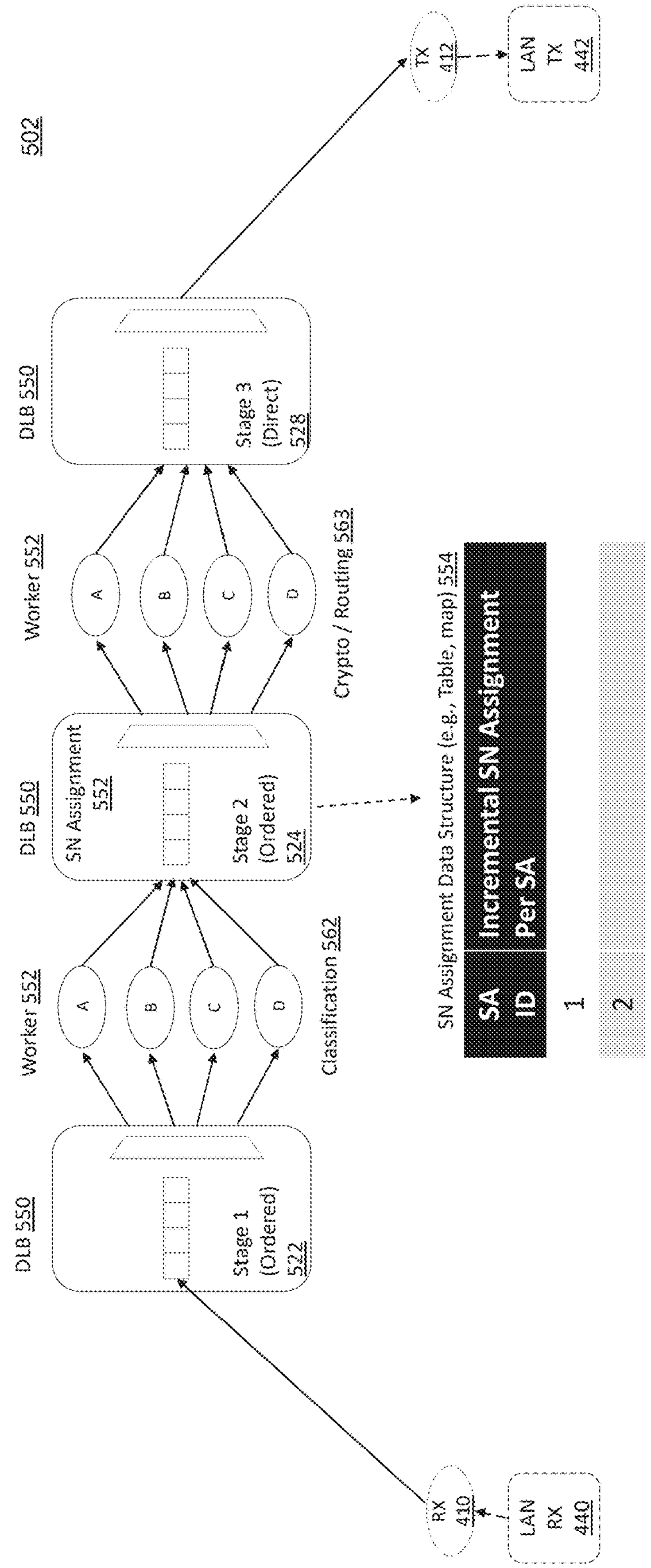
FIG. 5 illustrates outbound load balancing operations with a load balancer performing sequence number assignment in a multi-core computing system per some embodiments.

FIG. 5 illustrates outbound load balancing operations with a load balancer performing sequence number assignment in a multi-core computing system per some embodiments. The multi-core computing system 502 is similar to the multi-core computing system 402, and the same or similar references indicate elements or components having the same or similar functionalities.

The multi-core computing system 502 includes three stages, and stage one 522 includes load balancing operation at DLB 550 and classification operation 562 at worker 552, and these operations are similar to the one performed at stage one 422 in FIG. 4. Additionally, operations in stage three 528 are similar to the ones performed at operations in stage four 428 in FIG. 4.

At stage two 524 in FIG. 5, DLB 550 (instead of workers 452 in FIG. 4) performs sequence number assignment, where sequence numbers are generated and assigned to packets per SA. The sequence number assignment at DLB 550 may be based on a sequence number assignment data structure 554. In the sequence number assignment data structure 554, sequence numbers are assigned sequentially to packets mapped to a given SA ID (corresponding to a specific secure communication channel) based on the order that DLB 550 receives them. Since stage one 522 maintains the order of the packets, the sequence number assignment order will be the same as the original order as the packets entering the multi-core computing system 502. Note that while a table is shown as an example of the sequence number assignment data structure 554, the sequence number assignment data structure may also be created as a map, a list, an array, or a file that allows DLB 550 to map sequence numbers per SA.

Note that while the sequence number assignment data structure 554 is shown as indexed on the SA ID so packets in each flow will have its corresponding sequence numbers for packets of a given flow, the data structure may be indexed by another identifier that uniquely identifies a flow such as a flow ID or tunnel ID mapped to each flow. Additionally, while consecutive sequence numbers (1, 2, 3, 4 . . . ) may be assigned to packets of a flow in the order of the packets being received, some numbers may be skipped when assigned to the packets (e.g., only even or odd numbers are used in assignment). Furthermore, the assigned sequence numbers may not be from the smallest to the largest, the reverse order or other order may be used to assign the sequence numbers as well, as long as the sequence numbers as assigned may uniquely identify the order of packets within a given flow. Note that while the sequence numbers are discussed as per SA, they are assigned per flow or per tunnel when the flow ID and tunnel ID are used to identify the packets in the secure communication channels in some embodiments.

Offloading the sequence number assignment to DLB 550 removes the dedicated atomic sequence number assignment stage from the processing pipeline of the multi-core computing system 502. Instead, as packets are fed into the cipher/route stage, the sequence numbers are generated and allocated within DLB 550 and provided to the workers in the ciphering stage when they pull packets from DLB 550. The workers simply copy the DLB assigned sequence numbers into the packet headers of the corresponding packets in traffic flows. Removing the atomic sequence number assignment stage removes the overhead of one stage of packet processing and makes packet processing in the multi-core computing system 502 more efficient (e.g., through reducing processing cycles).

Outbound Load Balancing Implementation in Some Embodiments

In some embodiments, DLB 550 may recognize an anti-replay sequence number request (ARSN_REQ) flag on ingress for queue elements (QEs). DLB 550 may set how many of SAs/flows/tunnels it supports, and a SA/flow/tunnel ID corresponding to packets of a flow may be provided (e.g., by software) as a part of QE metadata. DLB 550 may set a range of sequence numbers (e.g., one that may be stored in a register/memory location covered in 32/64/128/512 bits) for each SA/flow/tunnel ID, where it monotonically assigns ever increasing/decreasing sequence numbers to packets in a given flow. The driver software may initialize the sequence numbers for a given flow to any initial value and may read them at any time (while other software may not have direct access to the sequence number). Additionally, the tunnels may be allocated in groups in some embodiments as IPSec processing is optimized to process a group of packets (e.g., ones from the same SA) at a time in these embodiments, and grouping reduces the overhead of loading IPSec parameters for each packet.

In some embodiments, DLB 550 checks the SA/flow/tunnel ID mapped to packets of a given flow after once the packets finished classification 562. When the ARSN_REQ flag (one or more bits in a register or another storage entity) is set (e.g., a bit of the one or more bits being set to be one or zero), DLB 550 assigns the proper sequence number (e.g., per the sequence number assignment data structure 554); when the ARSN_REQ flag is not set, DLB 550 assigns a marker number (e.g., number zero or negative number). For a QE with the ARSN_REQ flag being set, DLB 550 reads the next unique sequence number mapped to the corresponding SA/flow/tunnel ID, assigns the next unique sequence number to the QE/packet, increments the sequence number (e.g., counter), and stores the updated sequence number mapped to the SA/flow/tunnel ID to assign to the next arrived QE of the given flow in the queue.

In some embodiments, RX core 410 (a producer core) sets the ARSN_REQ flag for the packets/QEs for which sequence number assignment is required (e.g., the corresponding flow corresponding to an IPSec tunnel). All the packets with sequence number assigned will be given a sequence number by DLB 550 and the full range of the sequence numbers may be used by DLB 550 in sequence number assignments.

In some embodiments, a single QE carries a pointer to data for multiple packets (e.g., the data being a single packet including a list of pointers pointing to the multiple packets), and DLB 550 may assign a block of sequence number to the QE. For example, the single QE points to n packets, DLB 550 may assign sequence number SN, SN+1, . . . , SN+n to the QE so each packet in the batch gets a unique sequence number.

Inbound Load Balancing Operations

Figure 6:
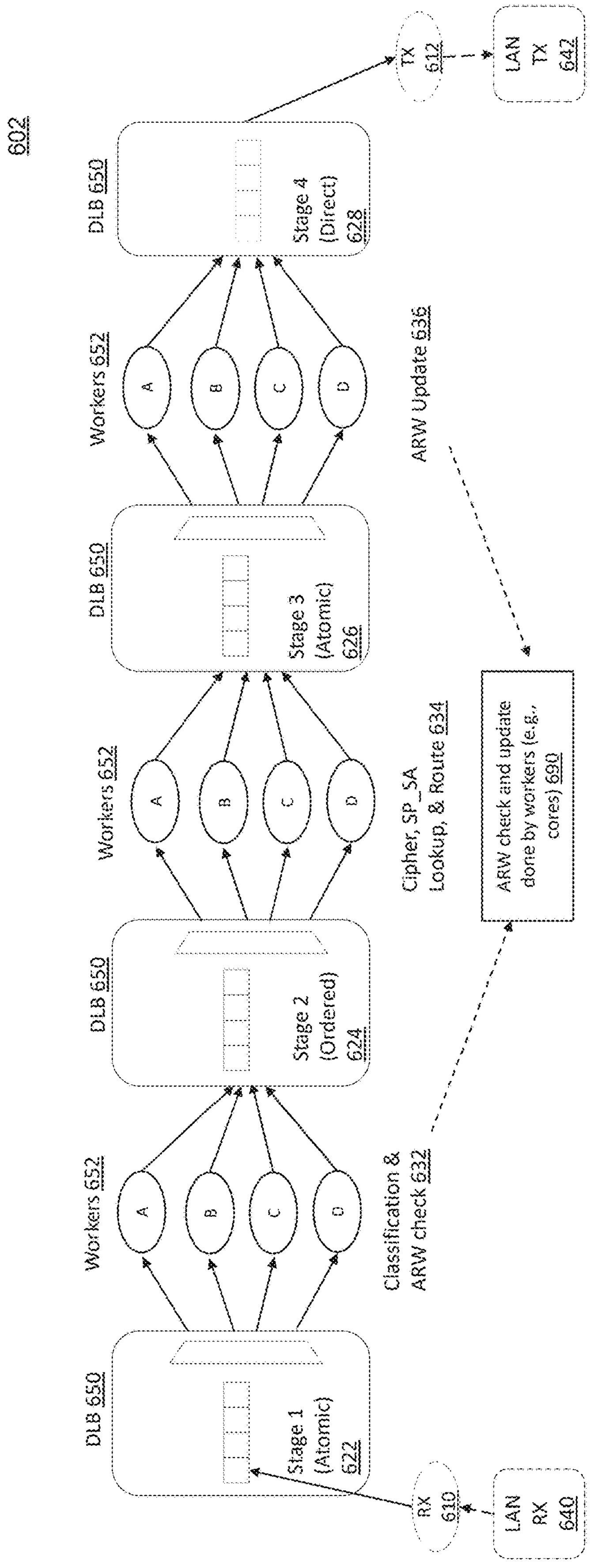
FIG. 6 illustrates inbound load balancing operations using atomic stages in a multi-core computing system.

FIG. 6 illustrates inbound load balancing operations using atomic stages in a multi-core computing system. The multi-core computing system 602 is similar to the multi-core computing system 402, and the same or similar references indicate elements or components having the same or similar functionalities. The inbound load balancing operations are done at the multi-core computing system that receives packets that are transmitted from another computing system (e.g., the multi-core computing system 402 or 502). Since a multi-core computing system often transmits and also receives packets, the multi-core computing system 602 may be the same one as the multi-core computing system 402 or 502, where the outbound multi-stage pipeline is implemented as disclosed in FIG. 4 or 5 and inbound multi-stage pipeline is implemented as disclosed in FIG. 6 (or FIG. 7).

The multi-core computing system 602 includes a receiver (RX) core 610 and a transmitter (TX) core 612 (e.g., cores same or similar to the RX core 310 and TX core 312, respectively), through which the multi-core computing system 602 receives and transmits packets of traffic flows respectively. The traffic flows are forwarded from one or more local area network (LAN) receiving ports 640 to the RX core 610 and transmitted to one or more LAN transmitting ports 642 from the TX core 612 in some embodiments. The traffic flows include packets that are transmitted from a secure communication channel (e.g., an IPSec tunnel) and have corresponding assigned sequence numbers as discussed herein above.

Workers 652 include cores A to D (workers includes more or less cores in other embodiments), and they can be one or more of the worker cores 208 or 314, and DLB 650 can be one or more of DLBs 202 or 304, similar to workers 452/552 and DLB 450/550.

At stage one 622, atomic scheduling is used at DLB 650 to distribute queue elements (QEs) corresponding to received packets (e.g., QEs including points to the received packets) of traffic flows to workers 652, and the QEs belonging to a given SA is processed by the same core in workers 652. Note that SA/flow/tunnel ID corresponding to packets of a flow may be provided as a part of QE metadata as discussed herein above.

Workers 652 performs classification and anti-replay window (ARW) check 632. The classification determines whether the packets require secure (e.g., IPSec) processing and if so, identifies the correct secure communication channel (e.g., IPSec tunnel) for the packets (e.g., based on the SA/flow/tunnel ID corresponding to packets).

The sequence numbers of the received packets are checked against an anti-replay window (ARW) for the mapped SA/flow/tunnel ID. The value range of the anti-replay window in the inbound direction corresponds to a specific span within the range of sequence numbers allocated in the outbound direction. All the values in the ARW are valid values assigned in the sequence number assignment stage of the outbound direction and the values in the ARW are constantly moving with successful decryption of accepted packets. For example, the range of sequence numbers for IPSec tunnel 0 may be between 1 to 500 as assigned in the sequence number assignment stage of the outbound direction, and the ARW may be in the range of 101 to 140 (i.e., the ARW width being 40, a span within the range of [1, 500] in the outbound direction). Once packets for IPSec tunnel 0 with sequence number 101 is successfully decrypted through IPSec tunnel 0, the ARW is updated to the range of 102 to 141 (i.e., the window span in the outbound direction having the same ARW width of 40, but the values within the span moved forward upon successful decryption of current packets).

If the sequence number of a received packet is outside of the anti-replay window (e.g., receiving a packet lagging behind, with a sequence number of 90 when the ARW is in the range of 101 to 140), the packet is dropped. If the sequence number of the received packet is within the anti-replay window, then a worker core checks whether the sequence number has been claimed by an earlier packet before (e.g., receiving a packet with sequence number 111 when the ARW is in the range of 101 to 140, but another earlier packet with sequence number 111 had been received earlier). When the sequence number has been claimed, the later received packet is deemed to be a duplicate and will be dropped.

The ARW check may be done based on a bit vector (referred to as ARW bit vector or bit mask), where each bit represents received valid sequence number. Packets are discarded if any of tests (1) to (3) fails: (1) the sequence number of a packet is outside of a number represented by the bits, (2) the sequence of the packet is a duplicate (e.g., the corresponding bit in the window has been set by an earlier packet, or (3) the sequence number fails integrity check (which can be done either on the full packet/QE or the sequence number itself). The ARW check may use another data structure (e.g., a table, a map, a list, an array, or a file) that maintains the range of valid sequence numbers and detects packet duplicates, and such ARW data structure is kept per SA. Note that the integrity check of the full packet/QE can be done by workers 634 here or during ciphering in stage two.

After classification and ARW check 632, the packets are then forwarded to stage two 624, where DLB 650 distributes the traffic flows to cores of workers 652 using the ordered scheduling. Workers 652 performs ciphering (decryption), security policy (SP) lookup, SA association lookup, and routing at reference 634. The operations may be processed out of order but the means to restoring the original order is maintained. The packets are decrypted and validated in this stage.

Then the packets are forwarded to stage three 626, where the ARW window information is updated by workers 652. Prior to updating the ARW update, workers 652 may repeat the ARW check to ensure that ARW status is correct after stages one and two, where packets are processed in parallel. Some packets may be discarded for failing tests (1) to (3) in the repeated ARW check. DLB 650 distributes the traffic flow to cores of workers 652 using the atomic scheduling, since the ARW data structure is kept per SA, and update of the ARW data structure needs to be atomic per SA. The multi-core computing system needs to ensure that two cores do not modify the same ARW structure concurrently. The stage two cannot provide such atomicity using the ordered scheduling. Further, doing ARW update in stage two is undesirable when some packets may fail tests (1) to (3) when they are processed in parallel by workers 652.

Thus, the packets per SA (e.g., ones belonging to the same IPSec tunnel) are processed by a single core in stage three, and the single core updates the ARW data structure, now the received packets are decrypted and validated, and the packets have completed the transmission in the secure communication channel. The ARW data structure can be updated to prepare to process new packets to be received. For example, the window is moved to a new sequence number range and the ARW bit vector is reset based on the new sequence number range.

After the ARW data structure are updated per SA, the packets are forwarded to stage four 628, where direct scheduling is applied, and packets of different flows are processed in a single queue as in the original order as they were prior to entering the multi-stage pipeline.

In the multi-stage pipeline as shown in FIG. 6, both ARW check and update are done by worker 652 as noted by reference 690. The inbound processing pipeline includes two atomic stages. As noted earlier, each atomic stage introduces substantial overhead (e.g., 50-100 processing cycles). The implementation of the ARW data structure is particularly problematic as the window is used for sequence number check stage (stage one) but is updated by separate window update stage (stage three) which is after packet decryption and validation. The multi-stage access causes cross-core snooping likely even when accesses are not contended since the ARW data structure is accessed constantly by Check and Update stages.

Figure 7:
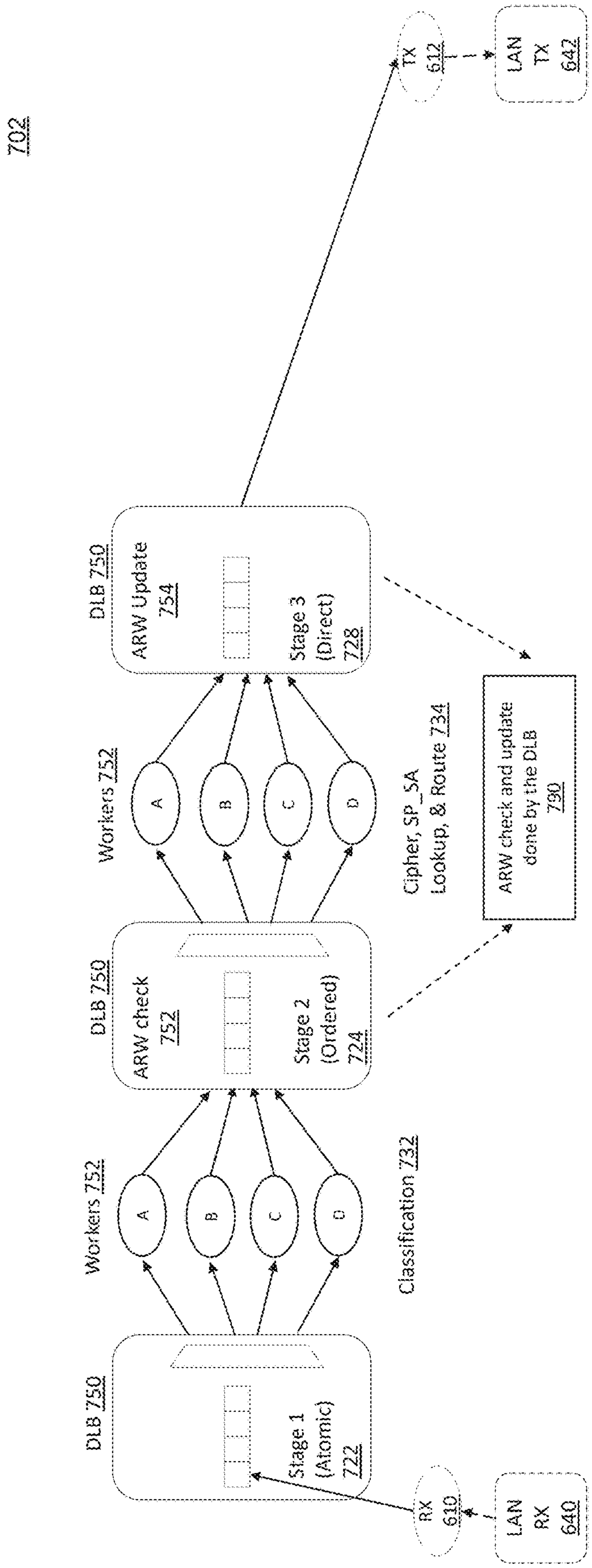
FIG. 7 illustrates inbound load balancing operations with a load balancer performing sequence anti-replay window check and update in a multi-core computing system per some embodiments.

Thus, it is desirable to remove at least one atomic stage in the inbound direction. FIG. 7 illustrates inbound load balancing operations with a load balancer performing sequence anti-replay window check and update in a multi-core computing system per some embodiments. The multi-core computing system 702 is similar to the multi-core computing system 602, and the same or similar references indicate elements or components having the same or similar functionalities.

The multi-core computing system 702 includes four stages, and stage one 722 includes load balancing operation at DLB 750 and classification operation 732 at worker 752, and these operations are similar to the ones performed at stage one 622 in FIG. 6.

At stage two 724 however, DLB 750 maintains an ARW data structure (per SA) internally and performs the ARW check. Workers 752 provides the sequence numbers and SA ID of the packets from classification 732 while sending the corresponding QEs into DLB 750, and DLB 750 performs the necessary ARW check (similar to what workers 650 do at stage one operations 632). When QEs are load balanced to workers 752, if the ARW check fails (e.g., if: (1) the sequence number of a packet is outside of a number represented by the bits, (2) the sequence of the packet is a duplicate (e.g., the corresponding bit in the window has been set by an earlier packet, or (3) the sequence number fails integrity check), a drop indicator is provided for the corresponding packets, and the packets with the drop indicator are discarded. Stage two uses the ordered distribution, so that the packets of the same SA may be processed by multiple cores as long as the means to restoring the original order is maintained.

At stage two 724, the packets that pass the ARW check are processed by workers 752, which perform ciphering (decryption), security policy (SP) lookup, SA association lookup, and routing at reference 734 (similar to what is done at reference 634).

At stage three 728, DLB 750 (instead of workers in FIG. 6) updates ARW window information and the ARW window information update is similar to the operation 636, but DLB 750 maintains the ARW and the update is done by DLB 750. The packets are then processed using direct scheduling, where packets of different flows are forwarded to the transmitter core 612 as in operation 628.

As noted at reference 790, DLB 750 performs the ARW check and update in the inbound direction, and workers 752 no longer access ARW data structure in multiple disjoint stages atomically. The offloading of the ARW check and update to DLB 750 reduces processing overhead and makes the multi-stage inbound packet processing more efficient.

Inbound Load Balancing Implementation in Some Embodiments

DLB 750 may set how many of SAs/flows/tunnels it supports, and a SA/flow/tunnel ID corresponding to packets of a flow may be provided (e.g., by software) as a part of QE metadata. In some embodiments, additional flags may be implemented for processing received packets in the inbound direction. For example, a flag, ARW_check, may be set per QE to identify whether the QE is to trigger ARW check; and another flag, ARW_update, may be set per QE to identify whether the QE is to trigger ARW update. These flags may be provided (e.g., by software) as a part of QE metadata at enqueue time.

DLB 750 may maintain a window (W) size (e.g., 2^N) per SA (e.g., the window size can be as high as four to eight thousands), a bit mask (BM) per SA mapped to the window size, and/or a current window location (CWL) (a boundary sequence number) per SA. FIG. 8 illustrates pseudo code for anti-replay check operation per some embodiments. Note that the sequence number uses 64 bits, and the valid values are in the range of CWL and CWL+MAX_AHEAD. The bit position for a particular sequence number is identified at reference 802. If the bit position has been set by an earlier packet (determined at reference 804), the corresponding packet is discarded.

For anti-replay window update, DLB 750 may verify that a QE has its corresponding ARW_check flag and ARW_update flag set first. If both flags are set, and the sequence number of the QE is ahead of the current window span, a window update is necessary. In some embodiments, if the sequence number is more than a full window ahead, then the new window has no overlap with the current and will be all zeros with the sequence number being the upper limit of the window span. Otherwise, the window is moved forward to terminate at the received sequence number as the upper limit of the window span and the bitmask is recalculated to have ones in position for any sequence numbers within the new ARW window that the corresponding packets corresponding have already been received.

For example, if an ARW has a span of [100, 101, 102, 103] and the packet with sequence number 103 has been received, the ARW bit vector for the ARW is 0001. If the packet with sequence number 110 is received (which is more than the full window width), the new ARW window has a span of [107, 108, 109, 110] and the ARW bit vector for the ARW is updated to 0001. However, if the packet with sequence number 105 is received (instead of the one with sequence number 110), the updated new ARW window has a span of [102, 103, 104, 105] and the ARW bit vector for the ARW is updated to 0101 to reflect the fact that packet 103 has been received already in addition to packet 105.

Note that FIGS. 5 and 7 and related discussion describe outbound and inbound load balancing operations with a load balancer performing sequence number assignment and anti-replay window check and update. In some embodiments, a DLB may perform the described operations in both outbound and inbound directions, and DLBs 550 and 750 are the same DLB operating at the two directions (one for transmitting packets and the other receiving packets). In other embodiments, a DLB may perform the described operations to remove an atomic stage in one direction only.

Operations in Some Embodiments

Figure 9:
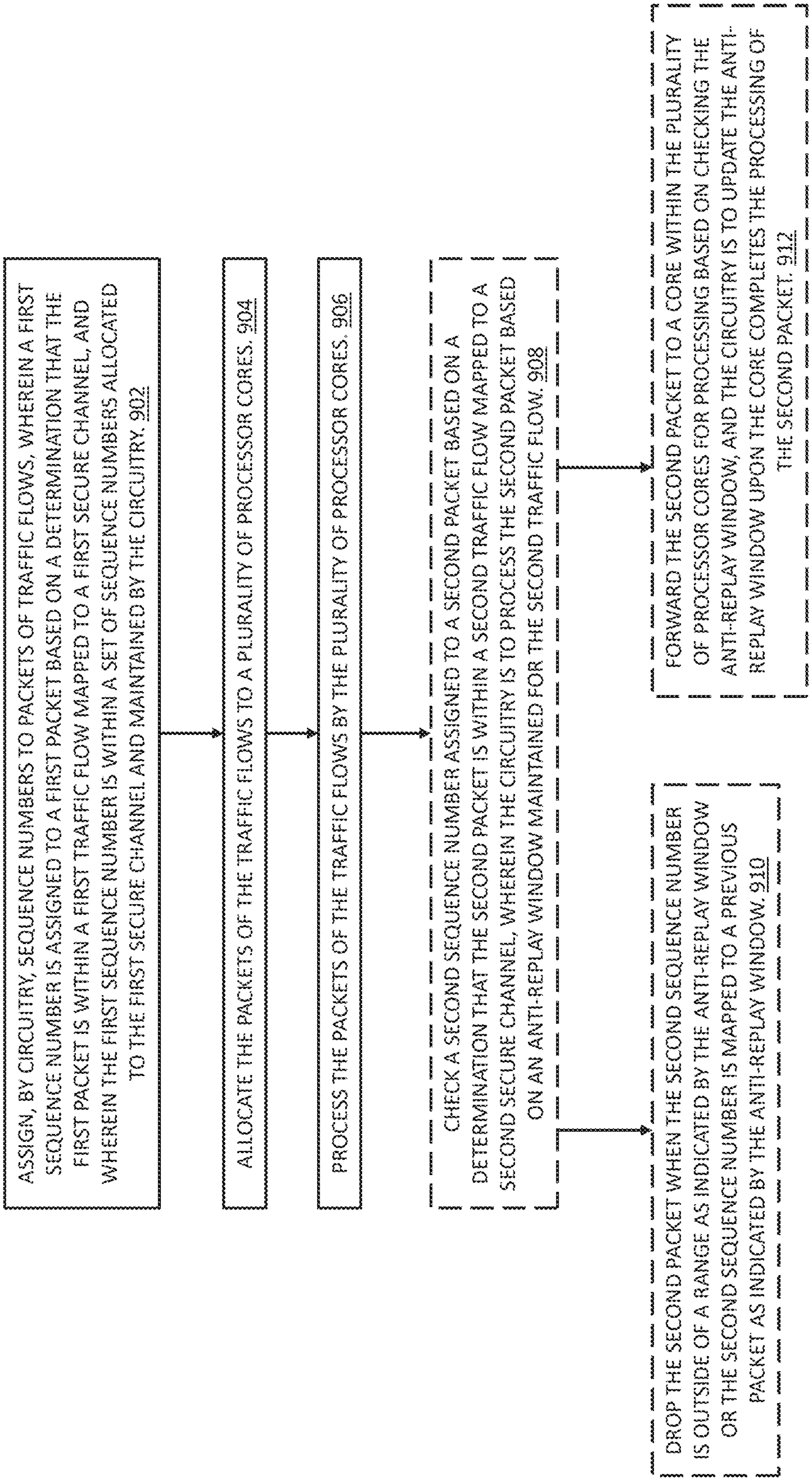
FIG. 9 illustrates the operation flow of assigning and checking anti-replay sequence numbers using load balancing per some embodiments.

FIG. 9 illustrates the operation flow of assigning and checking anti-replay sequence numbers using load balancing per some embodiments. The operations are performed by a load balancing hardware such as DLBs discussed herein. The circuitry to perform load balancing operations are implemented in a multi-core computing system that includes the circuitry and a plurality of cores.

At reference 902, circuitry (e.g., DLB 550) assigns sequence numbers to packets of traffic flows, where a first sequence number is assigned to a first packet based on a determination that the first packet is within a first traffic flow mapped to a first secure channel, and where the first sequence number is within a set of sequence numbers allocated to the first secure channel and maintained by the circuitry. The first secure channel may be an IPSec tunnel, a TLS session, an EVPN session, or a secure channel implemented in another secure communication protocol.

In some embodiments, the circuitry is to maintain a data structure that maps the first secure channel with the set of sequence numbers to be assigned to the packets of the first traffic flow, where the assignment of sequence numbers to packets within the first traffic flow is done sequentially. The data structure is the sequence number assignment data structure 554 discussed herein above, and the sequential sequence number assignment per traffic flow (or per corresponding SA/tunnel) are discussed herein above. In some embodiments, the first secure channel is identified based on a security association identifier (SA ID) as discussed herein above.

In some embodiments, the determination that the first packet is within the first traffic flow mapped to the first secure channel is based on a channel identifier within metadata mapped to the first packet as discussed herein above (e.g., the channel identifier can be a tunnel ID). In some embodiments, the determination that the first packet is within the first traffic flow mapped to the first secure channel is performed upon a determination that the metadata indicates an anti-replay flag is set for the first packet. For example, the anti-replay flag can be ARSN_REQ flag discussed herein above.

At reference 904, the circuitry is to allocate the packets of traffic flows to be processed among a plurality of processor cores. Then at reference 906, the packets of the traffic flows are processed by the plurality of processor cores.

The operations at references 902 to 906 are in the outbound direction, where sequence numbers are assigned to packets of traffic flows. Optionally in some embodiments, different circuitry (when DLB 750 is different from DLB 550) is used in the inbound direction when the packets have been assigned with sequence numbers. Yet in other embodiments, the same circuitry may process packets of flows in the inbound direction (e.g., when DLB 750 is different from DLB 550). In these embodiments, at reference 908, the circuitry is further to check a second sequence number assigned to a second packet based on a determination that the second packet is within a second traffic flow mapped to a second secure channel, and where the circuitry is to process the second packet based on an anti-replay window maintained for the second traffic flow.

At reference 910, the second packet is dropped when the second sequence number is outside of a range as indicated by the anti-replay window or the second sequence number is mapped to a previous packet as indicated by the anti-replay window. At reference 912, the circuitry is to forward the second packet to a core within the plurality of processor cores for processing based on checking the anti-replay window, and the circuitry is to update the anti-replay window upon the core completes the processing of the second packet.

In some embodiments, the anti-replay window comprises a window bit vector, and wherein setting a bit within the window bit vector indicates that a corresponding sequence number is mapped to a packet that has been processed. In some embodiments, the circuitry is to store a plurality of anti-replay windows, each for a secure channel supported by the apparatus.

Exemplary Processor Architecture

Figure 10:
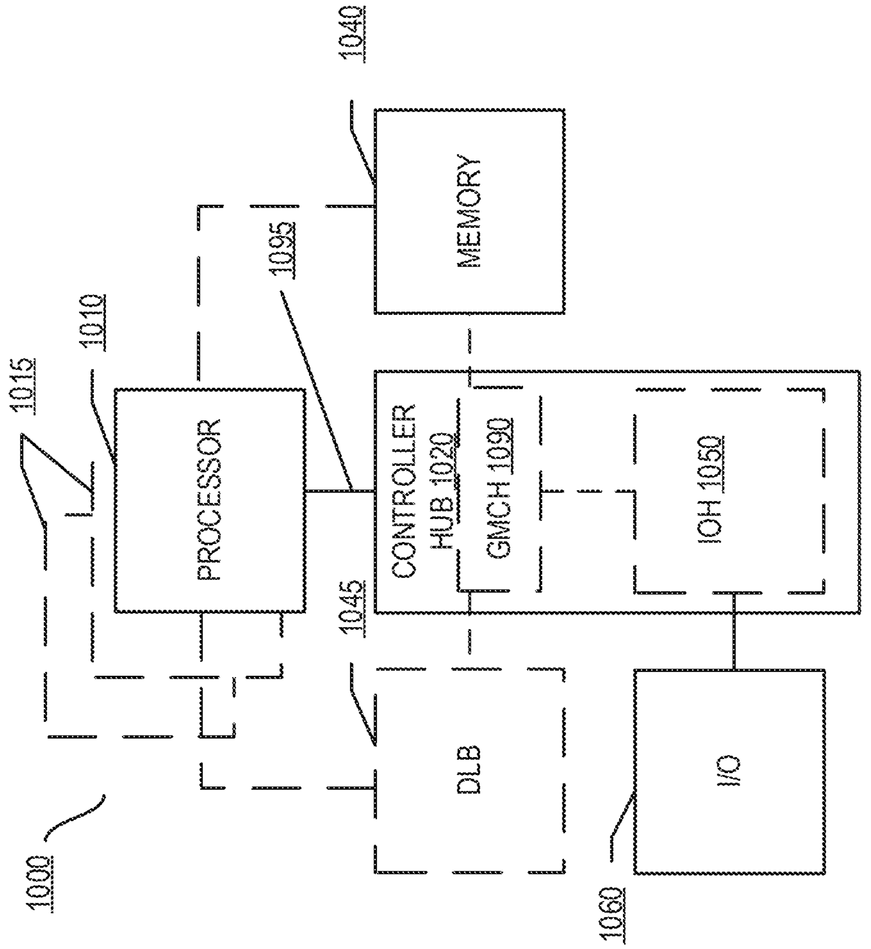
FIG. 10 is a block diagram of a system 1000 per some embodiments.
Figure 11:
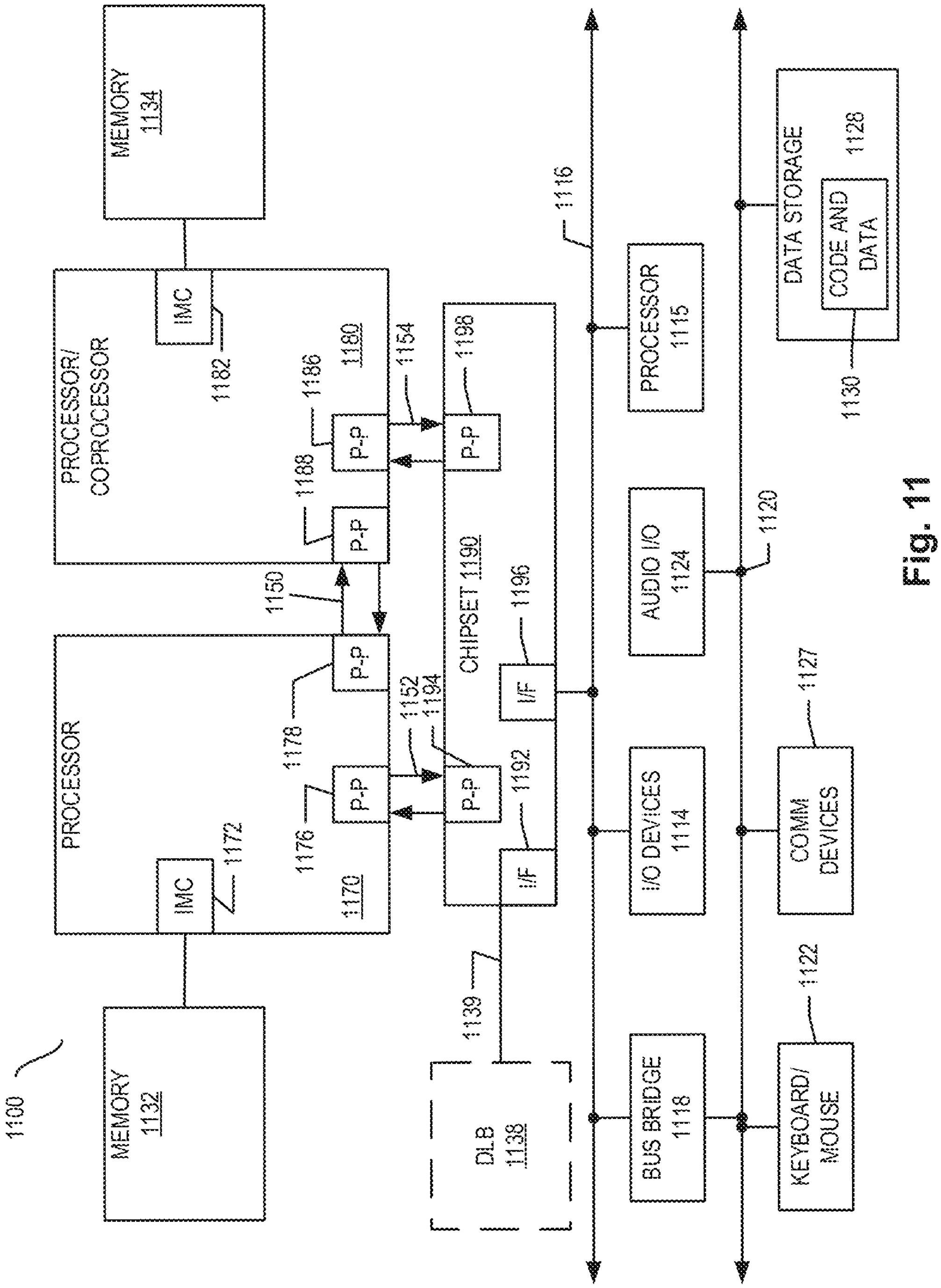
FIG. 11 is a block diagram of a more specific exemplary system 1100 per some embodiments.
Figure 12:
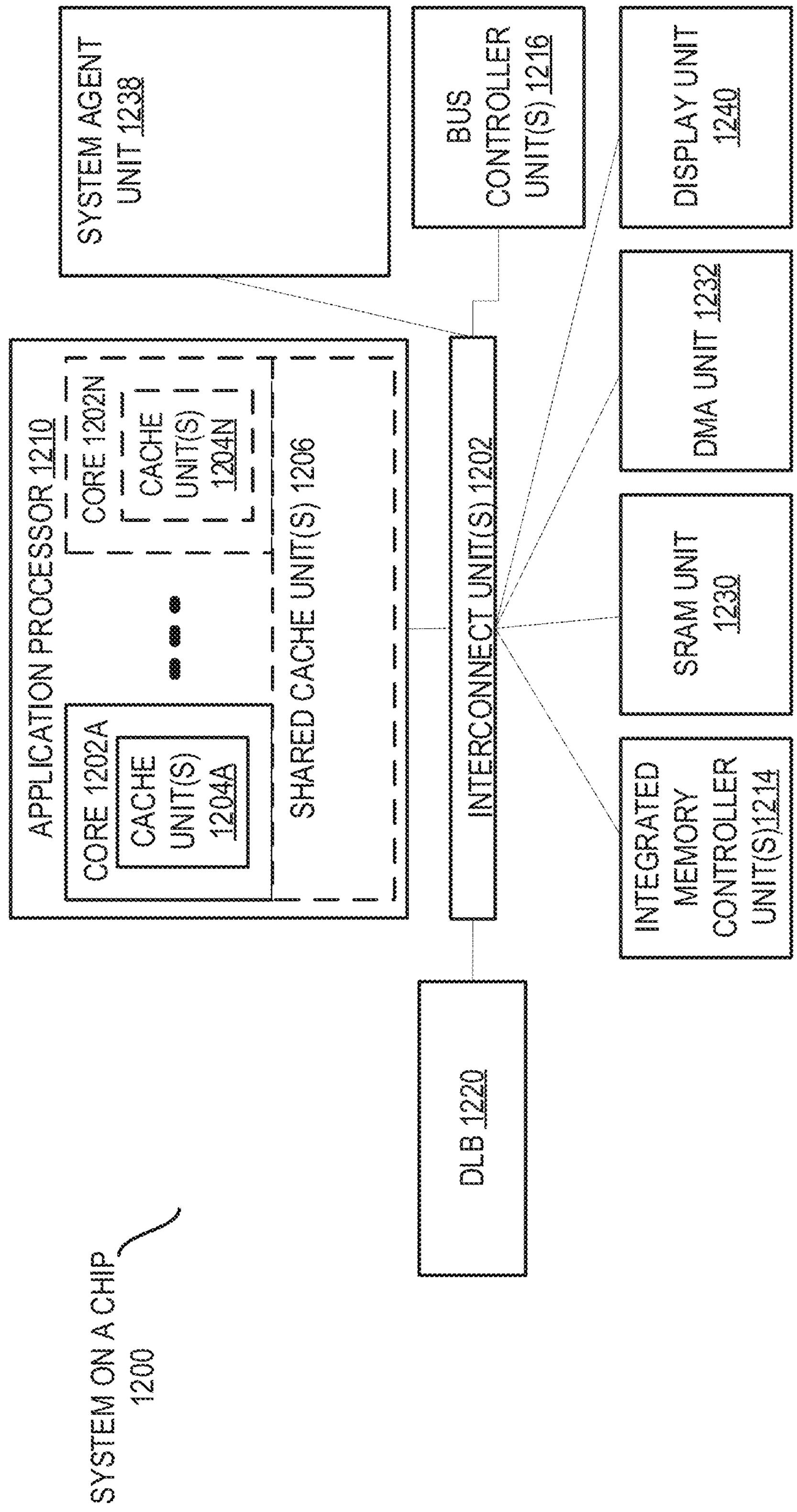
FIG. 12 is an example system on a chip (SoC) that may include one or more of the cores 1202 per some embodiments.

FIGS. 10-12 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, handheld devices, and various other electronic devices are also suitable. In general, a huge variety of systems or electronic devices capable of incorporating a processor and/or other execution logic as disclosed herein are generally suitable.

Referring now to FIG. 10, shown is a block diagram of a system 1000 per some embodiments. The system 1000 may include one or more processors 1010, 1015, which are coupled to a controller hub 1020. In one embodiment, the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a DLB 1045 that includes one or more DLBs described herein relating to FIGS. 1 to 9; the IOH 1050 couples input/output (I/O) devices 1060 to the GMCH 1090. Alternatively, one or both of the memory and graphics controllers are integrated within the processor (as described herein), the memory 1040 and the DLB 1045 are coupled directly to the processor 1010, and the controller hub 1020 in a single chip with the IOH 1050.

The optional nature of additional processors 1015 is denoted in FIG. 10 with broken lines. Each processor 1010, 1015 may include one or more of the processing cores described herein.

The memory 1040 may be, for example, dynamic random-access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface such as QuickPath Interconnect (QPI), or similar connection 1095.

In one embodiment, the DLB 1045 is a special-purpose processor/circuit/circuitry, such as, for example, an embedded processor, a DSP (digital signal processor), a field-programmable gate array, or the like. In one embodiment, controller hub 1020 may include an integrated graphics accelerator.

There can be a variety of differences between the processors 1010, 1015 in terms of a spectrum of metrics of merit including architectural, microarchitectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached DLB 1045. Accordingly, the processor 1010 issues these coprocessor instructions (or control signals representing coprocessor instructions) on a coprocessor bus or other interconnect, to coprocessor 1045. DLB 1045 accepts and executes the received instructions. Alternatively, DLB 1045 accepts and executes the same instruction set as the ones for processors 1010 to 1015.

Referring now to FIG. 11. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of one or more of the processors 1010 to 1015. In one embodiment of the invention, processors 1170 and 1180 are respectively processors 1010 and 1015, while DLB 1138 is DLB 1045. In another embodiment, processors 1170 and 1180 are respectively processor 1010 and processor 1015.

Processors 1170 and 1180 are shown including integrated memory controller (IMC) units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with DLB 1138 via a high-performance interface 1139. In one embodiment, DLB 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPUs, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

FIG. 12 is an example system on a chip (SoC) that may include one or more of the cores 1202 per some embodiments. Other system designs and configurations known in the arts for laptops, desktops, handheld PCs, personal digital assistants, engineering workstations, servers, network devices, network hubs, switches, embedded processing devices, digital signal processing devices (DSPs), graphics devices, video game devices, set-top boxes, micro controllers, cell phones, portable media players, handheld devices, and various other electronic devices are also suitable. In general, a huge variety of systems or electronic devices capable of incorporating a processing device and/or other execution logic as disclosed herein are generally suitable.

Referring now to FIG. 12, shown is a block diagram of a SoC 1200 in accordance with an implementation of the disclosure. Also, dashed lined boxes are features on more advanced SoCs. In FIG. 12, an interconnect unit(s) 1202 is coupled to an application processing device 1210 which includes a set of one or more cores 1202A-N and shared cache unit(s) 1206; a system agent unit 1238; a bus controller unit(s) 1216; an integrated memory controller unit(s) 1214; a set of one or more DLBs 1220 that include DLBs described herein relating to FIGS. 1 to 9; a static random access memory (SRAM) unit 1230; a direct memory access (DMA) unit 1232; and a display unit 1240 for coupling to one or more external displays. The implementations of the outbound and inbound multi-stage pipeline can be implemented in SoC 1200.

Further Examples

Example 1 provides an exemplary apparatus comprising circuitry to assign sequence numbers to packets of traffic flows, wherein a first sequence number is assigned to a first packet based on a determination that the first packet is within a first traffic flow mapped to a first secure channel, and wherein the first sequence number is within a set of sequence numbers allocated to the first secure channel and maintained by the circuitry, the circuitry to allocate the packets of traffic flows to be processed among a plurality of processor cores. The exemplary apparatus further comprises the plurality of processor cores to process the packets of traffic flows.

Example 2 includes the substance of Example 1, wherein the circuitry is to maintain a data structure that maps the first secure channel with the set of sequence numbers to be assigned to packets of the first traffic flow, wherein the assignment of sequence numbers to packets within the first traffic flow is done sequentially.

Example 3 includes the substance of Examples 1 to 2, wherein the first secure channel is identified based on a security association identifier.

Example 4 includes the substance of Examples 1 to 3, wherein the determination that the first packet is within the first traffic flow mapped to the first secure channel is based on a channel identifier within metadata mapped to the first packet.

Example 5 includes the substance of Examples 1 to 4, wherein the determination that the first packet is within the first traffic flow mapped to the first secure channel is performed upon a determination that the metadata indicates an anti-replay flag is set for the first packet.

Example 6 includes the substance of Examples 1 to 5, wherein the circuitry is further to check a second sequence number assigned to a second packet based on a determination that the second packet is within a second traffic flow mapped to a second secure channel, and wherein the circuitry is to process the second packet based on an anti-replay window maintained for the second traffic flow.

Example 7 includes the substance of Examples 1 to 6, wherein the second packet is dropped when the second sequence number is outside of a range as indicated by the anti-replay window or the second sequence number is mapped to a previous packet as indicated by the anti-replay window.

Example 8 includes the substance of Examples 1 to 7, wherein the circuitry is to forward the second packet to a core within the plurality of processor cores for processing based on checking the anti-replay window, and the circuitry is to update the anti-replay window upon the core completes the processing of the second packet.

Example 9 includes the substance of Examples 1 to 8, wherein the anti-replay window comprises a window bit vector, and wherein setting a bit within the window bit vector indicates that a corresponding sequence number is mapped to a packet that has been processed.

Example 10 includes the substance of Examples 1 to 9, wherein the circuitry is to store a plurality of anti-replay windows, each for a secure channel supported by the apparatus.

Example 11 provides an exemplary method, including assigning, by circuitry, sequence numbers to packets of traffic flows, wherein a first sequence number is assigned to a first packet based on a determination that the first packet is within a first traffic flow mapped to a first secure channel, and wherein the first sequence number is within a set of sequence numbers allocated to the first secure channel and maintained by the circuitry. The method further includes allocating the packets of traffic flows to be processed among a plurality of processor cores, and processing the packets of traffic flows by the plurality of processor cores.

Example 12 includes the substance of Example 11, wherein the circuitry is to maintain a data structure that maps the first secure channel with the set of sequence numbers to be assigned to packets of the first traffic flow, wherein the assignment of sequence numbers to packets within the first traffic flow is done sequentially.

Example 13 includes the substance of Examples 11 to 12, wherein the determination that the first packet is within the first traffic flow mapped to the first secure channel is based on a channel identifier within metadata mapped to the first packet.

Example 14 includes the substance of Examples 11 to 13, the method further comprises checking a second sequence number assigned to a second packet based on a determination that the second packet is within a second traffic flow mapped to a second secure channel, and wherein the circuitry is to process the second packet based on an anti-replay window maintained for the second traffic flow.

Example 15 includes the substance of Examples 11 to 14, the method further comprises dropping the second packet when the second sequence number is outside of a range as indicated by the anti-replay window or the second sequence number is mapped to a previous packet as indicated by the anti-replay window.

Example 16 provides an exemplary computer-readable storage medium storing instructions that when executed by a processor of a computing system, are capable of causing the computing system to perform: assigning, by circuitry, sequence numbers to packets of traffic flows, wherein a first sequence number is assigned to a first packet based on a determination that the first packet is within a first traffic flow mapped to a first secure channel, and wherein the first sequence number is within a set of sequence numbers allocated to the first secure channel and maintained by the circuitry. The computing system is caused to further perform allocating the packets of traffic flows to be processed among a plurality of processor cores, and processing the packets of traffic flows by the plurality of processor cores.

Example 17 includes the substance of Example 16, wherein the circuitry is to maintain a data structure that maps the first secure channel with the set of sequence numbers to be assigned to packets of the first traffic flow, wherein the assignment of sequence numbers to packets within the first traffic flow is done sequentially.

Example 18 includes the substance of Examples 16 to 17, wherein the determination that the first packet is within the first traffic flow mapped to the first secure channel is based on a channel identifier within metadata mapped to the first packet.

Example 19 includes the substance of Examples 16 to 18, the computing system is caused to further perform checking a second sequence number assigned to a second packet based on a determination that the second packet is within a second traffic flow mapped to a second secure channel, and wherein the circuitry is to process the second packet based on an anti-replay window maintained for the second traffic flow.

Example 20 includes the substance of Examples 16 to 19, wherein a set of encryption keys for the encryption is transmitted to the debug host computer for decrypting the trace data, wherein the anti-replay window comprises a window bit vector, and wherein setting a bit within the window bit vector indicates that a corresponding sequence number is mapped to a packet that has been processed.

Example 21 provides an exemplary apparatus comprising a first means to assign sequence numbers to packets of traffic flows, wherein a first sequence number is assigned to a first packet based on a determination that the first packet is within a first traffic flow mapped to a first secure channel, and wherein the first sequence number is within a set of sequence numbers allocated to the first secure channel and maintained by the first means, the first means to allocate the packets of traffic flows to be processed among a plurality of processor cores. The exemplary apparatus further comprises the plurality of processing means to process the packets of traffic flows.

Example 22 includes the substance of Example 21, wherein the first means is to maintain a data structure that maps the first secure channel with the set of sequence numbers to be assigned to packets of the first traffic flow, wherein the assignment of sequence numbers to packets within the first traffic flow is done sequentially.

Example 23 includes the substance of Examples 21 to 22, wherein the first secure channel is identified based on a security association identifier.

Example 24 includes the substance of Examples 21 to 23, wherein the determination that the first packet is within the first traffic flow mapped to the first secure channel is based on a channel identifier within metadata mapped to the first packet.

Example 25 includes the substance of Examples 21 to 24, wherein the determination that the first packet is within the first traffic flow mapped to the first secure channel is performed upon a determination that the metadata indicates an anti-replay flag is set for the first packet.

Example 26 includes the substance of Examples 21 to 25, wherein the first means is further to check a second sequence number assigned to a second packet based on a determination that the second packet is within a second traffic flow mapped to a second secure channel, and wherein the first means is to process the second packet based on an anti-replay window maintained for the second traffic flow.

Example 27 includes the substance of Examples 21 to 26, wherein the second packet is dropped when the second sequence number is outside of a range as indicated by the anti-replay window or the second sequence number is mapped to a previous packet as indicated by the anti-replay window.

Example 28 includes the substance of Examples 21 to 27, wherein the first means is to forward the second packet to a core within the plurality of processor cores for processing based on checking the anti-replay window, and the first means is to update the anti-replay window upon the core completes the processing of the second packet.

Example 29 includes the substance of Examples 21 to 28, wherein the anti-replay window comprises a window bit vector, and wherein setting a bit within the window bit vector indicates that a corresponding sequence number is mapped to a packet that has been processed.

Example 30 includes the substance of Examples 21 to 29, wherein the first is to store a plurality of anti-replay windows, each for a secure channel supported by the apparatus.

Additional Explanation

In the foregoing specification, the embodiments of invention have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer-readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical, or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well-known structures and functions were not described in elaborate detail in order to avoid obscuring the subject matter of the present invention. Accordingly, the scope and spirit of the invention should be judged in terms of the claims which follow.

What is claimed is:

1. An apparatus comprising:

circuitry to assign sequence numbers to packets of traffic flows, wherein a first sequence number is assigned to a first packet based on a determination that the first packet is within a first traffic flow mapped to a first secure channel, and wherein the first sequence number is within a set of sequence numbers allocated to the first secure channel and maintained by the circuitry, the circuitry to distribute the packets of traffic flows to be processed among a plurality of processor cores, wherein the first sequence number assigned to the first packet is to be inserted in header of the first packet by a processor core within the plurality of processor cores; and the plurality of processor cores to process the packets of traffic flows.

2. The apparatus of claim 1, wherein the circuitry is to maintain a data structure that maps the first secure channel with the set of sequence numbers to be assigned to packets of the first traffic flow, wherein assignment of the sequence numbers to packets within the first traffic flow is done sequentially.

3. The apparatus of claim 1, wherein the first secure channel is identified based on a security association identifier.

4. The apparatus of claim 1, wherein the determination that the first packet is within the first traffic flow mapped to the first secure channel is based on a channel identifier within metadata mapped to the first packet.

5. The apparatus of claim 4, wherein the determination that the first packet is within the first traffic flow mapped to the first secure channel is performed upon a determination that the metadata indicates an anti-replay flag is set for the first packet.

6. The apparatus of claim 1, wherein the circuitry is further to check a second sequence number assigned to a second packet based on a determination that the second packet is within a second traffic flow mapped to a second secure channel, and wherein the circuitry is to process the second packet based on an anti-replay window maintained for the second traffic flow.

7. The apparatus of claim 6, wherein the second packet is dropped when the second sequence number is outside of a range as indicated by the anti-replay window or the second sequence number is mapped to a previous packet as indicated by the anti-replay window.

8. The apparatus of claim 6, wherein the circuitry is to forward the second packet to a core within the plurality of processor cores for processing based on checking the anti-replay window, and the circuitry is to update the anti-replay window upon the core completes the processing of the second packet.

9. The apparatus of claim 6, wherein the anti-replay window comprises a window bit vector, and wherein setting a bit within the window bit vector indicates that a corresponding sequence number is mapped to a packet that has been processed.

10. The apparatus of claim 1, wherein the circuitry is to store a plurality of anti-replay windows, each for a secure channel supported by the apparatus.

11. A method comprising:

assigning, by circuitry, sequence numbers to packets of traffic flows, wherein a first sequence number is assigned to a first packet based on a determination that the first packet is within a first traffic flow mapped to a first secure channel, and wherein the first sequence number is within a set of sequence numbers allocated to the first secure channel and maintained by the circuitry;

distributing the packets of traffic flows to be processed among a plurality of processor cores; and processing the packets of traffic flows by the plurality of processor cores, wherein the first sequence number assigned to the first packet is to be inserted in header of the first packet by a processor core within the plurality of processor cores.

12. The method of claim 11, wherein the circuitry is to maintain a data structure that maps the first secure channel with the set of sequence numbers to be assigned to packets of the first traffic flow, wherein assignment of the sequence numbers to packets within the first traffic flow is done sequentially.

13. The method of claim 11, wherein the determination that the first packet is within the first traffic flow mapped to the first secure channel is based on a channel identifier within metadata mapped to the first packet.

14. The method of claim 11, further comprising:

checking a second sequence number assigned to a second packet based on a determination that the second packet is within a second traffic flow mapped to a second secure channel, and wherein the circuitry is to process the second packet based on an anti-replay window maintained for the second traffic flow.

15. The method of claim 14, further comprising:

dropping the second packet when the second sequence number is outside of a range as indicated by the anti-replay window or the second sequence number is mapped to a previous packet as indicated by the anti-replay window.

16. A non-transitory computer-readable storage medium storing instructions that when executed by a processor of a computing system, are capable of causing the computing system to perform:

assigning, by circuitry, sequence numbers to packets of traffic flows, wherein a first sequence number is assigned to a first packet based on a determination that the first packet is within a first traffic flow mapped to a first secure channel, and wherein the first sequence number is within a set of sequence numbers allocated to the first secure channel and maintained by the circuitry;

distributing the packets of traffic flows to be processed among a plurality of processor cores; and processing the packets of traffic flows by the plurality of processor cores, wherein the first sequence number assigned to the first packet is to be inserted in header of the first packet by a processor core within the plurality of processor cores.

17. The non-transitory computer-readable storage medium of claim 16, wherein the circuitry is to maintain a data structure that maps the first secure channel with the set of sequence numbers to be assigned to packets of the first traffic flow, wherein assignment of the sequence numbers to packets within the first traffic flow is done sequentially.

18. The non-transitory computer-readable storage medium of claim 16, wherein the determination that the first packet is within the first traffic flow mapped to the first secure channel is based on a channel identifier within metadata mapped to the first packet.

19. The non-transitory computer-readable storage medium of claim 16, wherein the computing system is caused to further perform:

checking a second sequence number assigned to a second packet based on a determination that the second packet is within a second traffic flow mapped to a second secure channel, and wherein the circuitry is to process the second packet based on an anti-replay window maintained for the second traffic flow.

20. The non-transitory computer-readable storage medium of claim 19, wherein the anti-replay window comprises a window bit vector, and wherein setting a bit within the window bit vector indicates that a corresponding sequence number is mapped to a packet that has been processed.

* * * * *